(12) United States Patent
Visscher et al.

(10) Patent No.: US 12,514,670 B2
(45) Date of Patent: *Jan. 6, 2026

(54) MULTI-MODAL MICROSCOPIC IMAGING

(71) Applicant: Inscopix, Inc., Mountain View, CA (US)

(72) Inventors: Koen Visscher, Mountain View, CA (US); Pei Sabrina Xu, Mountain View, CA (US); Shay Neufeld, Mountain View, CA (US)

(73) Assignee: Inscopix, Inc., Mountain View, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/543,190

(22) Filed: Dec. 18, 2023

(65) Prior Publication Data

US 2024/0115344 A1    Apr. 11, 2024

Related U.S. Application Data

(63) Continuation-in-part of application No. 18/198,486, filed on May 17, 2023, now Pat. No. 12,109,074.
(Continued)

(51) Int. Cl.
*A61B 90/20* (2016.01)
*A61B 5/00* (2006.01)
(Continued)

(52) U.S. Cl.
CPC .......... *A61B 90/20* (2016.02); *A61B 5/0059* (2013.01); *A61B 5/0071* (2013.01); *A61B 5/4064* (2013.01); *G01N 21/6458* (2013.01); *G02B 21/0004* (2013.01); *G02B 21/0096* (2013.01); *G02B 21/025* (2013.01); *G02B 21/06* (2013.01); *G02B 21/16* (2013.01); *G02B 21/32* (2013.01); *A61B 5/0035* (2013.01); *A61B 5/24* (2021.01);
(Continued)

(58) Field of Classification Search
None
See application file for complete search history.

(56) References Cited

U.S. PATENT DOCUMENTS

| 4,244,634 A | 1/1981 | Dianetti et al. |
| 4,605,287 A | 8/1986 | Lang et al. |

(Continued)

FOREIGN PATENT DOCUMENTS

| EP | 2609742 A2 | 7/2013 |
| EP | 3350578 A1 | 7/2018 |

(Continued)

*Primary Examiner* — Eileen M Adams
(74) *Attorney, Agent, or Firm* — Quarles & Brady LLP; Yakov S. Sidorin

(57) ABSTRACT

An adapter configured to be optically coupled to a plurality of microscopes and having (i) a first microscope interface configured to optically couple a first microscope system to an optical element that is in optical communication with an optical probe to provide first imaging data of a sample, and (ii) a second microscope interface configured to optically couple a second microscope system to the optical element to provide second imaging data of the sample. An optical imaging apparatus and method utilizing such adapter.

31 Claims, 16 Drawing Sheets

Related U.S. Application Data which is a continuation of application No. 17/484,791, filed on Sep. 24, 2021, now Pat. No. 11,690,696, application No. 18/543,190 is a continuation-in-part of application No. 17/481,123, filed on Sep. 21, 2021, now Pat. No. 11,960,072, said application No. 17/484,791 is a continuation of application No. 16/851,678, filed on Apr. 17, 2020, now Pat. No. 11,197,735, said application No. 17/481,123 is a continuation of application No. PCT/US2020/026730, filed on Apr. 3, 2020, said application No. 16/851,678 is a continuation of application No. 15/964,832, filed on Apr. 27, 2018, now Pat. No. 10,682,197, which is a continuation of application No. PCT/US2016/060717, filed on Nov. 4, 2016.

(60) Provisional application No. 62/829,276, filed on Apr. 4, 2019, provisional application No. 62/383,122, filed on Sep. 2, 2016, provisional application No. 62/251,501, filed on Nov. 5, 2015.

(51) Int. Cl.

| | | |
|---|---|---|
| *G01N 21/64* | (2006.01) | |
| *G02B 21/00* | (2006.01) | |
| *G02B 21/02* | (2006.01) | |
| *G02B 21/06* | (2006.01) | |
| *G02B 21/16* | (2006.01) | |
| *G02B 21/32* | (2006.01) | |
| *A61B 5/24* | (2021.01) | |
| *G01Q 10/00* | (2010.01) | |
| *G02B 3/14* | (2006.01) | |
| *G02B 21/24* | (2006.01) | |

(52) U.S. Cl.
CPC .............. *G01N 2021/6439* (2013.01); *G01N 2021/6441* (2013.01); *G01Q 10/00* (2013.01); *G02B 3/14* (2013.01); *G02B 21/242* (2013.01)

(56) References Cited

U.S. PATENT DOCUMENTS

| | | | |
|---|---|---|---|
| 5,349,468 A | 9/1994 | Rathbone et al. | |
| 5,736,410 A | 4/1998 | Zarling et al. | |
| 6,072,622 A | 6/2000 | Biber et al. | |
| 6,466,366 B1 | 10/2002 | Dominique | |
| 7,511,891 B2 | 3/2009 | Messerschmidt | |
| 7,742,213 B2 | 6/2010 | Potsaid | |
| 8,099,156 B1* | 1/2012 | Schnitzer | A61B 1/227 600/478 |
| 8,270,071 B2 | 9/2012 | Glaser et al. | |
| 8,346,346 B1 | 1/2013 | Schnitzer et al. | |
| 8,624,967 B2 | 1/2014 | O'Connell et al. | |
| 8,696,722 B2 | 4/2014 | Lee et al. | |
| 8,788,021 B1 | 7/2014 | Flusberg et al. | |
| 9,161,694 B2 | 10/2015 | Schnitzer et al. | |
| 9,195,043 B2 | 11/2015 | Ghosh et al. | |
| 9,474,448 B2 | 10/2016 | Ghosh et al. | |
| 9,498,135 B2 | 11/2016 | Ghosh et al. | |
| 9,629,554 B2 | 4/2017 | Ghosh et al. | |
| 9,636,020 B2 | 5/2017 | Flusberg et al. | |
| 9,643,550 B2 | 5/2017 | Beining | |
| 9,839,361 B2 | 12/2017 | Schnitzer et al. | |
| 10,200,657 B2 | 2/2019 | Ghosh | |
| 10,386,623 B2 | 8/2019 | Visscher et al. | |
| 10,682,197 B2 | 6/2020 | Trulson et al. | |
| 10,813,552 B2 | 10/2020 | Ghosh et al. | |
| 10,908,405 B2 | 2/2021 | Trulson et al. | |
| 11,595,622 B2 | 2/2023 | Ghosh | |
| 11,690,696 B2 | 7/2023 | Trulson | |
| 11,960,072 B2* | 4/2024 | Visscher | G06T 7/33 |
| 12,109,074 B2* | 10/2024 | Trulson | G02B 21/06 |
| 2002/0135871 A1 | 9/2002 | Vodyanoy et al. | |
| 2005/0237605 A1 | 10/2005 | Vodyanoy et al. | |
| 2006/0092503 A1 | 5/2006 | Saunders | |
| 2006/0210962 A1 | 9/2006 | Imaizumi et al. | |
| 2009/0201577 A1 | 8/2009 | Laplante et al. | |
| 2009/0244545 A1 | 10/2009 | Toida et al. | |
| 2010/0097692 A1 | 4/2010 | Glaser et al. | |
| 2011/0127405 A1* | 6/2011 | Grossman | G02B 21/0032 250/492.1 |
| 2011/0260720 A1 | 10/2011 | Fischer et al. | |
| 2012/0062723 A1 | 3/2012 | Ghosh et al. | |
| 2012/0105949 A1 | 5/2012 | Cummings et al. | |
| 2013/0100271 A1 | 4/2013 | Howes et al. | |
| 2013/0260382 A1* | 10/2013 | Ghosh | G02B 21/33 435/6.12 |
| 2014/0043462 A1 | 2/2014 | Ghosh et al. | |
| 2014/0046408 A1 | 2/2014 | Shoham et al. | |
| 2014/0321772 A1 | 10/2014 | Piche et al. | |
| 2015/0087902 A1 | 3/2015 | Mertz et al. | |
| 2015/0301029 A1 | 10/2015 | Eggan et al. | |
| 2015/0309295 A1 | 10/2015 | Cocker et al. | |
| 2015/0331549 A1 | 11/2015 | Legris | |
| 2015/0344061 A1 | 12/2015 | Uematsu | |
| 2016/0018631 A1* | 1/2016 | Yang | G02B 21/365 359/363 |
| 2016/0022148 A1 | 1/2016 | Schnitzer et al. | |
| 2016/0183782 A1* | 6/2016 | Yu | A61B 90/20 606/4 |
| 2017/0059841 A1 | 3/2017 | Trulson et al. | |
| 2017/0205255 A1* | 7/2017 | Nannipieri | H04B 10/0731 |
| 2017/0296060 A1 | 10/2017 | Ghosh et al. | |
| 2018/0074306 A1 | 3/2018 | Visscher et al. | |
| 2018/0202935 A1 | 7/2018 | Bahlman et al. | |
| 2018/0217364 A1 | 8/2018 | Cocker et al. | |
| 2018/0220106 A1 | 8/2018 | Ghosh | |
| 2018/0296074 A1 | 10/2018 | Trulson et al. | |
| 2018/0303573 A1 | 10/2018 | Trulson et al. | |
| 2018/0356624 A1 | 12/2018 | Isobe et al. | |
| 2019/0133449 A1 | 5/2019 | Flusberg et al. | |
| 2019/0133453 A1 | 5/2019 | Schnitzer et al. | |
| 2019/0356884 A1 | 11/2019 | Ghosh | |
| 2020/0057290 A1 | 2/2020 | Visscher et al. | |
| 2021/0029329 A1 | 1/2021 | Ghosh | |
| 2021/0059578 A1 | 3/2021 | Nassi et al. | |
| 2021/0059782 A1 | 3/2021 | Trulson et al. | |
| 2021/0141204 A1 | 5/2021 | Visscher et al. | |
| 2021/0247603 A1 | 8/2021 | Trulson et al. | |
| 2021/0267458 A1 | 9/2021 | Ghosh et al. | |

FOREIGN PATENT DOCUMENTS

| | | |
|---|---|---|
| EP | 3371572 A1 | 9/2018 |
| EP | 3513238 A1 | 7/2019 |

\* cited by examiner

MULTI-MODAL MICROSCOPIC IMAGING

CROSS-REFERENCE TO RELATED APPLICATIONS

This application is a continuation-in-part from the U.S. patent application Ser. No. 17/481,123 filed on Sep. 21, 2021 and now published as US 2022/0099954, which is a continuation of the International Patent Application No. PCT/US20/26730, filed Apr. 3, 2020 and published as WO 2020/206362, which claims priority to the U.S. Provisional Patent Application No. 62/829,276 filed on Apr. 4, 2019.

This application is also a continuation-in-part of the U.S. patent application Ser. No. 18/198,486 filed on May 17, 2023 and now published as US 2023/02885107, which in turn is a continuation of the U.S. patent application Ser. No. 17/484,791 filed on Sep. 24, 2021 and granted as U.S. Pat. No. 11,690,696, which is a continuation of the U.S. patent application Ser. No. 16/851,678, filed Apr. 17, 2020 and granted as U.S. Pat. No. 11,197,735, which is a continuation of the U.S. patent application Ser. No. 15/964,832, filed Apr. 27, 2018 and granted as U.S. Pat. No. 10,682,197, which is a continuation of the International Application No. PCT/US2016/060717, filed Nov. 4, 2016 and published as WO 2017/079688, which claims the benefit of and priority from the U.S. Provisional Application No. 62/251,501, filed on Nov. 5, 2015, and the U.S. Provisional Application No. 62/383,122, filed on Sep. 2, 2016.

The disclosure of each of the above-identified patent documents and other publications mentioned in this patent application is incorporated herein by reference.

TECHNICAL FIELD

The present invention relates to microscope systems configured for in vitro and in vivo imaging, and specifically to a microscope apparatus employing a judiciously configured adapter and an optical assembly containing at least a portion of an optical system of at least one of multiple microscopes that are integrated with one another both optically and mechanically via such adapter. The adapter is structured to facilitate alignment of multiple images captured by two or more of the constituent microscopes (of the apparatus) that are used to simultaneously or sequentially image a sample or subject. A given constituent microscope of the apparatus may include a stimulation light source and an illumination light source to implement simultaneous imaging of a sample while stimulating at least a fraction of the sample. In a specific instance, the adapter may be used with a microscope apparatus that is mounted on a live and/or freely-behaving subject for in vivo imaging of, for example, brain tissue while, optionally, modulating the wave properties (e.g., wavelength, frequency, intensity, and power) of the illumination light and the stimulation light to reduce cross talk between the illumination light and the stimulation light.

SUMMARY

An embodiment of the invention provides an adapter configured to be optically coupled to a plurality of microscopes. Such adapter includes (i) a first microscope interface configured to optically couple a first microscope system to an optical element that is in optical communication with an optical probe to provide functional imaging data of a sample, and (ii) a second microscope interface configured to optically couple a second microscope system to the optical element to provide structural imaging data of the sample.

Embodiments of the invention also provide an optical imaging apparatus that is configured to carry out multi-modal imaging of an internal tissue within a subject. Such apparatus includes an embodiment of the adapter addressed above, and an optical assembly that includes (i) a portion of an illumination optical arm of a chosen microscope system of the first and second microscope systems (which portion of the illumination optical arm includes one or more illumination light-emitting elements and is configured to direct illumination light to the tissue within a specified field-of-view (FOV); and (ii) a portion of a stimulation optical arm of the chosen microscope system (which chosen microscope system includes one or more stimulation light-emitting elements and is configured to direct stimulation light to at least one of a first portion of the tissue within the specified FOV, a second portion of the tissue outside of the specified FOV, and optionally to a third portion of the tissue that is partially within the specified FOV). At least one embodiment of the apparatus may include an optical probe that is optically and/or mechanically coupled with the optical element and the optical assembly through an interface of the first and second interfaces, and that is configured to deliver the illumination light and the stimulation light to the internal tissue without transmitting the illumination light and/or the stimulation light through a biological barrier surrounding the subject. (Optionally, such optical probe may be configured to collect light reflected, scattered, or emitted by the tissue and relay said light to an imaging optical arm of the apparatus and/or be configured as a lens or lens system at least partially implantable in the subject and/or be configured as an optical component shared by the illumination optical arm and the stimulation optical arm.) Alternatively or in addition, the embodiment of the apparatus may include one or more deformable lenses configured to adjust a corresponding focal depth of at least one of the illumination optical arm and the stimulation optical arm. Alternatively or in addition, in one identified embodiment, the optical assembly of the apparatus may further includes a portion of an imaging optical arm of the chosen microscope system (which portion of the imaging optical arm contains an image sensor and is configured to receive an imaging light including light reflected, scattered, or emitted by the tissue to generate an image of the tissue within the specified FOV). (In at least one specific implementation, such identified embodiment may include an optical probe (a) that is optically and/or mechanically coupled with the optical assembly through an interface of the first and second interfaces and that is configured to deliver the illumination light and the stimulation light to the internal tissue without transmitting the illumination light and/or the stimulation light through a biological barrier surrounding the subject and (b) that is configured as an optical component shared by the illumination optical arm, the stimulation optical arm, the imaging optical arm, and any combination thereof; and/or be characterized by the illumination optical arm, the stimulation optical arm, and the imaging optical arm sharing at least one deformable lens.)

Alternatively or in addition—and substantially in every implementation—the apparatus may be configured to image the internal tissue onto the image sensor with a spatial resolution of better than 2 µm at a center of a corresponding FOV. Alternatively or in addition, and substantially in every embodiment, the optical imaging apparatus may be complemented by a processor operably cooperated with the optical assembly and a tangible readable memory medium that comprises software-encoded instructions which, when loaded onto the processor, cause the processor to perform one or more of the following groups of operations: group 1: (i) to process the functional imaging data, received through the adapter, to generate a first overlaid image, (ii) to process the structural imaging data, received through the adapter, to generate a second overlaid image, and (iii) to co-register the first overlaid image and the second overlaid image with the use of aligning at least a portion of the first overlaid image and the second overlaid image based at least in part on a coordinate transformation (here, the coordinate transformation is derived based at least in part on a difference in sizes, shapes, positions, or orientations of a landmark feature present both in the first overlaid image and the second overlaid image); and group 2: (i) to govern an operation of said one or more illumination light-emitting elements to modulate the illumination light in a time-dependent and/or spatially-dependent fashion; and/or (ii) to govern an operation of said one or more stimulation light-emitting elements to modulate the stimulation light in a time-dependent and/or spatially-dependent manner; and/or (iii) to adjust an effective focal length of the chosen microscope system. When the apparatus include the processor, the processor may be configured to generate the second overlaid image by using the structural data to generate a multi-photon structural image and/or confocal structural image, using the functional data to generate a multi-photon functional image and/or confocal/confocal functional image, and overlaying the multi-photon structural image and/or confocal structural image with the multi-photon functional image and/or confocal functional image; and/or be configured to use the difference in sizes, shapes, positions, or orientations of the landmark feature in the first overlaid image and in the second overlaid image to determine an amount of distortion or warping of the landmark feature between the first overlaid image and the second overlaid image; and/or be configured to generate a third overlaid image from the first overlaid image and the second overlaid image after the co-registering. At least in an embodiment including the generation of the third overlaid image, the processor may be additionally configured to set the first overlaid image to a first color channel and the second overlaid image to a second color channel different from the first color channel when generating the third overlaid image. Substantially in every implementation of the apparatus, the processor may be configured to generate the first overlaid image by obtaining a first cell map, constructing a structural image from a mean projection of a motion corrected movie, and overlaying the cell map with the structural image. The first microscope system may include a one-photon microscope or a multi-photon microscope and/or the second microscope system may include a confocal microscope and/or the first microscope system and the second microscope system include microscopes of different types. The first microscope interface may be configured to permit the adapter to bear a weight of the first microscope system and/or the second microscope interface may be configured to permit the adapter to bear a weight of the second microscope system.

Alternatively or in addition, an embodiment of the apparatus may be complemented with a processor operably cooperated with the optical assembly and a tangible readable memory medium that comprises software-encoded instructions which, when loaded onto the processor, cause the processor to perform at least one of the following groups of operations: group 1: (i) to process the functional imaging data, received through the adapter, to generate a first overlaid image, (ii) to process the structural imaging data, received through the adapter, to generate a second overlaid image, and (ii) to co-register the first overlaid image and the second overlaid image by dividing the first overlaid image and the second overlaid image into a plurality of sections and performing image registration for each section of the plurality of sections; and group 2: (i) to govern an operation of said one or more illumination light-emitting elements to modulate the illumination light in a time-dependent and/or spatially-dependent fashion; and/or (ii) to govern an operation of said one or more stimulation light-emitting elements to modulate the stimulation light in a time-dependent and/or spatially-dependent manner; and/or (iii) to adjust an effective focal length of the chosen microscope system. When the optical imaging apparatus includes such a processor, the processor may be configured to generate the first and second overlaid images and to use a difference in sizes, shapes, positions, or orientations of a landmark feature present both in the first overlaid image and in the second overlaid image to train a neural network to determine how a size, a shape, a position, or an orientation of the landmark feature is altered between different optical imaging modalities present in the system and/or the software-encoded instructions may be configured to cause the processor: to deliver the stimulation light to said internal tissue in a pattern; and/or to alter the pattern based on a response of the tissue to the stimulation light; and/or to modify the pattern based detecting an object of interest at the internal tissue within the specified FOV based on analysis of an image of the internal tissue generated at the image sensor.

Embodiments of the invention additionally provide a method for forming an image of an internal tissue of a freely behaving subject. The method includes at least the following steps: removably attaching a housing containing the optical assembly of an embodiment of the optical imaging apparatus discussed above to the adapter of such apparatus (which adapter has been connected and/or affixed to been freely movable subject in a fixed position) to align the optical assembly with respect to the internal tissue; delivering at least one of (i) imaging light from one or more illumination light-emitting elements through a portion of an illumination optical arm of the chosen microscope system, and (ii) stimulation light from one or more stimulation light-emitting elements through a portion of a stimulation optical arm of the chosen microscope system to the internal tissue; and acquiring, at an image sensor of the microscope system, light that has been reflected, scattered, or emitted by the internal tissue to generate the image of the internal tissue. The step of delivering and/or the step of acquiring may include transmitting light through an optical probe an optical that is optically and/or mechanically coupled with the optical element and the optical assembly through an interface of the first and second interfaces; and or the step of delivering may be devoid of (that is, does not include) transmitting the imaging light and/or the stimulation light through a biological barrier surrounding the subject; and/or said the step of delivering and/or the step of acquiring may include transmitting light through an optical probe of said microscope system, wherein the optical probe includes a GRIN lens. In at least one implementation of the method of the invention, the optical imaging apparatus may additionally include a portion of an imaging optical arm of the chosen microscope system (which portion of the imaging optical arm includes an image sensor and is configured to receive light reflected, scattered, or emitted by said tissue to generate an image of the tissue within the specified FOV); and said the step of delivering and/or the step of acquiring may include transmitting light through one or more deformable lenses configured to adjust a corresponding focal depth of at least one of the illumination optical arm, the stimulation optical arm, and the imaging optical arm. Alternatively or in addition—and in at least one implementation—the method may further include a step of processing functional imaging data, received through the adapter, with a processor operably cooperated with the image sensor, to generate a first overlaid image; a step of processing structural imaging data, received through the adapter, to generate a second overlaid image; and a step of co-registering the first overlaid image and the second overlaid image by (or with the use of) aligning at least a portion of the first overlaid image and the second overlaid image based at least in part on a coordinate transformation. (Here, the coordinate transformation is derived based at least in part on a difference in sizes, shapes, positions, or orientations of a landmark feature present both in the first overlaid image and the second overlaid image.) Alternatively or in addition—and in at least one implementation—the method may include a step of modulating the illumination light in a time-dependent and/or spatially-dependent fashion; and/or a step of modulating the stimulation light in a time-dependent and/or spatially-dependent manner; and/or a step of adjusting an effective focal length of the chosen microscope system of the first and second microscope systems.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which.

Figure 1:
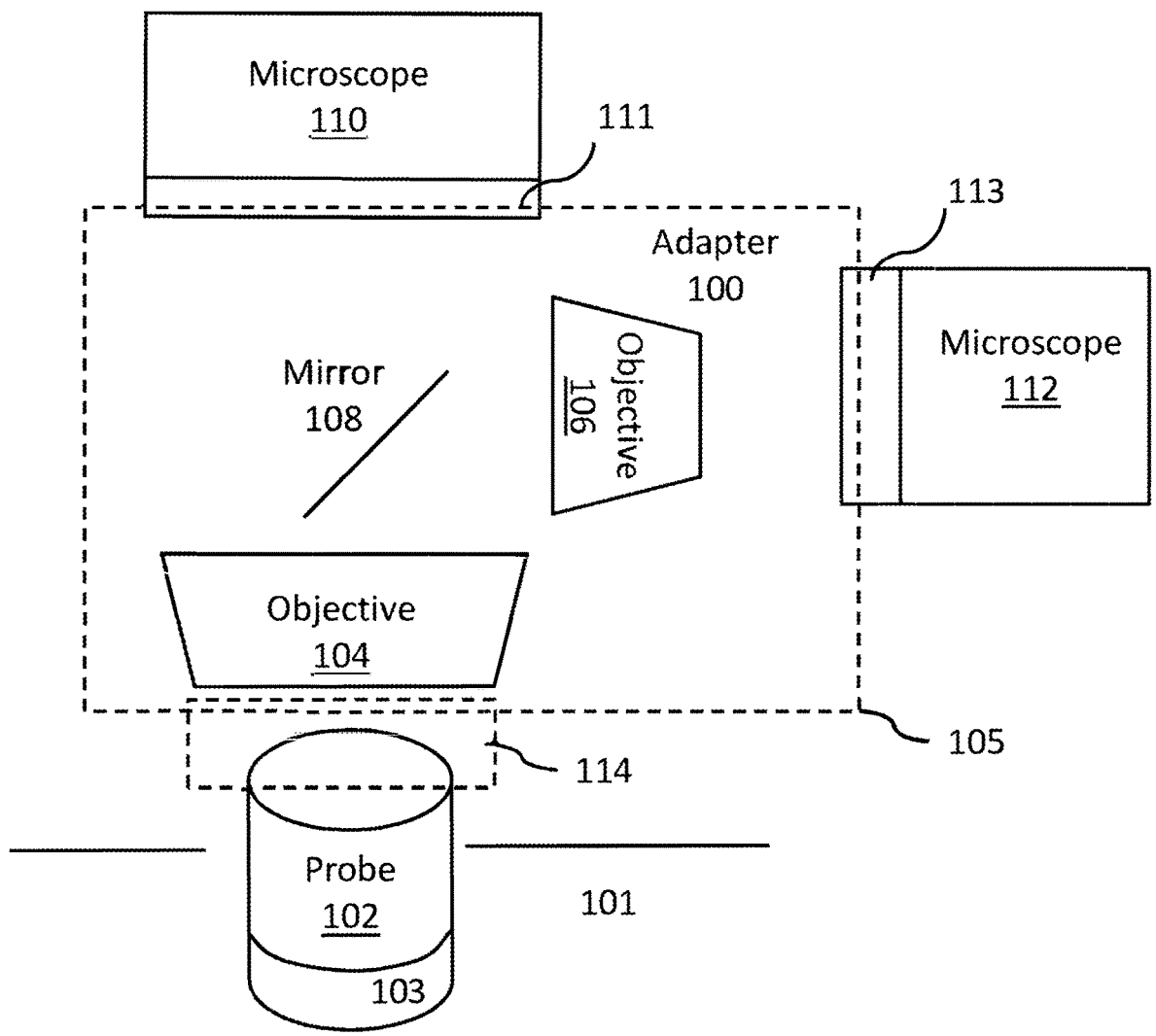
FIG. 1 shows an example of a schematic diagram of an adapter for use in microscopic imaging, in accordance with embodiments of the invention. The adapter comprises a number of optical elements that may be configured in any of a variety of different optical arrangements.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another. While specific embodiments are illustrated in the figures with the understanding that the disclosure is intended to be illustrative, these specific embodiments are not intended to limit the scope of invention implementations of which are described and illustrated herein.

DETAILED DESCRIPTION

Implementations of the invention include systems and methods configured to provide for optical and/or mechanical coupling of microscopes to form an overall optical imaging apparatus configured to carry out a process of multi-mode imaging of a chosen target (such as, in one specific case, an inner biological tissue that is located under the skin of a body of a chosen organism). For example, to operationally couple multiple microscopes (among which, generally, two different microscopes represent two different imaging modalities such as, for example, a multi-photon imaging and a confocal imaging) judiciously configured adapter may be employed, which facilitates such multi-modal microscopic imaging simultaneously and/or sequentially—that is substantially as desired.

Generally, a given implementation of an adapter may include one or more interfaces appropriately structured to receive/accept and support a corresponding of the constituent microscope system of the apparatus. (for example, the adapter may contain a first microscope interface and a second microscope interface, each of which is adjusted to be operably coordinated—optically and/or mechanically—with a corresponding of the microscopes). While an adapter to be utilized with two microscopes is primarily discussed below, it shall be understood that the adapter may enable 3, 4, 5, or more microscopes to be used together in the same apparatus.

As part of a given adapter, an optical arrangement may be employed that is configured to direct light (e.g. excitation light, stimulation light) from a given light source used in conjunction with the apparatus to a target sample and/or direct light collected from the target sample (e.g. emission light generated at the sample) to the first and or second microscope system. The optical arrangement may include substantially every optical element such as a lens, an optical filter, an optical mirror, etc. In at least one case, the operational coordination between the adapter and the appended to it (interfaced with it) optical assembly of a given microscope system is such that the adapter incorporates at least one objective of a microscope.

In some instances, the adapter may comprise one or more objective lenses. Each of the objectives incorporated in the adapter is configured to allow the adapter to be optically coupled to some other optical device and/or assembly. In one example, when a given adapter includes a first objective and a second objective, the first objective may be optically coupled to an optical probe device (which, in turn, may be structured to be partially or fully implanted in the tissue of a subject—in one specific case as a GRIN lens), thereby facilitating not only the delivery of the illumination light and/or the stimulation light from the optical assembly of a given constituent microscope system of the apparatus to such internal tissue (notably—without transmitting the illumination light and/or such stimulation light through a biological barrier surrounding the tissue) but—in at least one specific case—the imaging of internal portion of the tissue within the subject (also without transmitting the imaging light through such barrier. The second objective may be optically coupled to an auxiliary microscope system for capturing images using imaging light conveyed by the optical probe. The adapter may thus facilitate detachment and re-attachment of a given microscope (optically and/or mechanically) to the implanted optical probe between imaging sessions.

Among the constituent microscope systems of the overall apparatus there may be a bright-field microscope, a darkfield microscope, a polarizing microscope, a phase contrast microscope, a differential interference contrast microscope, a fluorescence microscope, a total internal reflection fluorescence microscope, a microscope system employing a laser source, a multiphoton excitation based microscope system, a structured illumination microscope system, to name just a few. However, in at least one specific implementation, an optical assembly interfaced with the adapter includes, as discussed for example in U.S. patent application Ser. No. 18/198,486 at least a portion of an illumination optical arm of a given microscope system (which illumination arm contains one or more illumination light-emitting elements and is configured to direct illuminating light to the target sample or object within a specified field-of-view (FOV) and a portion of a stimulation optical arm of such microscope system (which stimulation optical arm contains one or more stimulation light-emitting elements and is configured to direct stimulation light to at least one of a first portion of the target object within the specified FOV, a second portion of such target object outside of the specified FOV, and to a third portion of such target object that is partially within the specified FOV). The optical assembly may optically also include a portion of an imaging optical arm of the same microscope system (which portion of the imaging optical arm includes an image sensor and is configured to receive light reflected from and/or scattered by and/or emitted by the target object—that is, imaging light) to generate an image of the target object within the specified FOV.

The constituent microscope systems of the apparatus can be of different sizes. While in some instance a given microscope may be a conventional bench top microscope, in another instance the microscope may be a miniature microscope (configured or sized to be mechanically as well as optically coupled to a live and/or freely-moving being through the adapter and/or via another component such as a base plate). For example, the microscope may be configured to be grounded or, in some instances, mounted on a live being such as a mouse, a rat, a bird, or a primate. In some instances, the base plate (if present) and/or the optical probe (e.g. a GRIN lens) may interface with both a first microscope and a second microscope via the same embodiment of the adapter.

In some instances, the adapter may be a very small and/or light weight device that comprises three or more optical interfaces and an optical arrangement that allows two or more microscopes to be optically and/or mechanically coupled to an optical probe that is partially or fully implanted in the tissue of a subject, thereby facilitating the imaging of tissue within the subject by the two or more microscopes using light conveyed by the optical probe. The adapter may thus be structured to facilitate detachment and re-attachment of one or more of the microscope (optically and/or mechanically) to the implanted optical probe between imaging sessions. In some instances, contents of the adapter may be configured to function as the objective of one of the microscopes. In some instances, the adapter may be small and/or light weight enough that it is fully or partially supported by one of the two or more microscopes, and may be used to image a live subject that has been immobilized relative to the position of the one microscope. In some instances, the adapter may (in operation of the overall imaging apparatus) be fully or partially supported by the optical probe, or by a baseplate attached to the subject while at the same time fully or partially supporting one of the two or more microscopes mated with the corresponding interfaces of the adapter. In some instances, the adapter may be fully or partially supported by the optical probe, or by a baseplate attached to a freely moving subject, and may itself fully or partially support one of the two or more microscopes that is used to image a freely moving subject as it goes about its normal behavior. In some instances, the adapter may be used with a single microscope to image a sample or subject even if it is configured to be optically and/or mechanically coupled to more than one microscope. The adapter may be judiciously structured to facilitate detachment and re-attachment of at least one of the two or more microscopes (optically and/or mechanically) to the implanted optical probe between imaging sessions.

Figure 2:
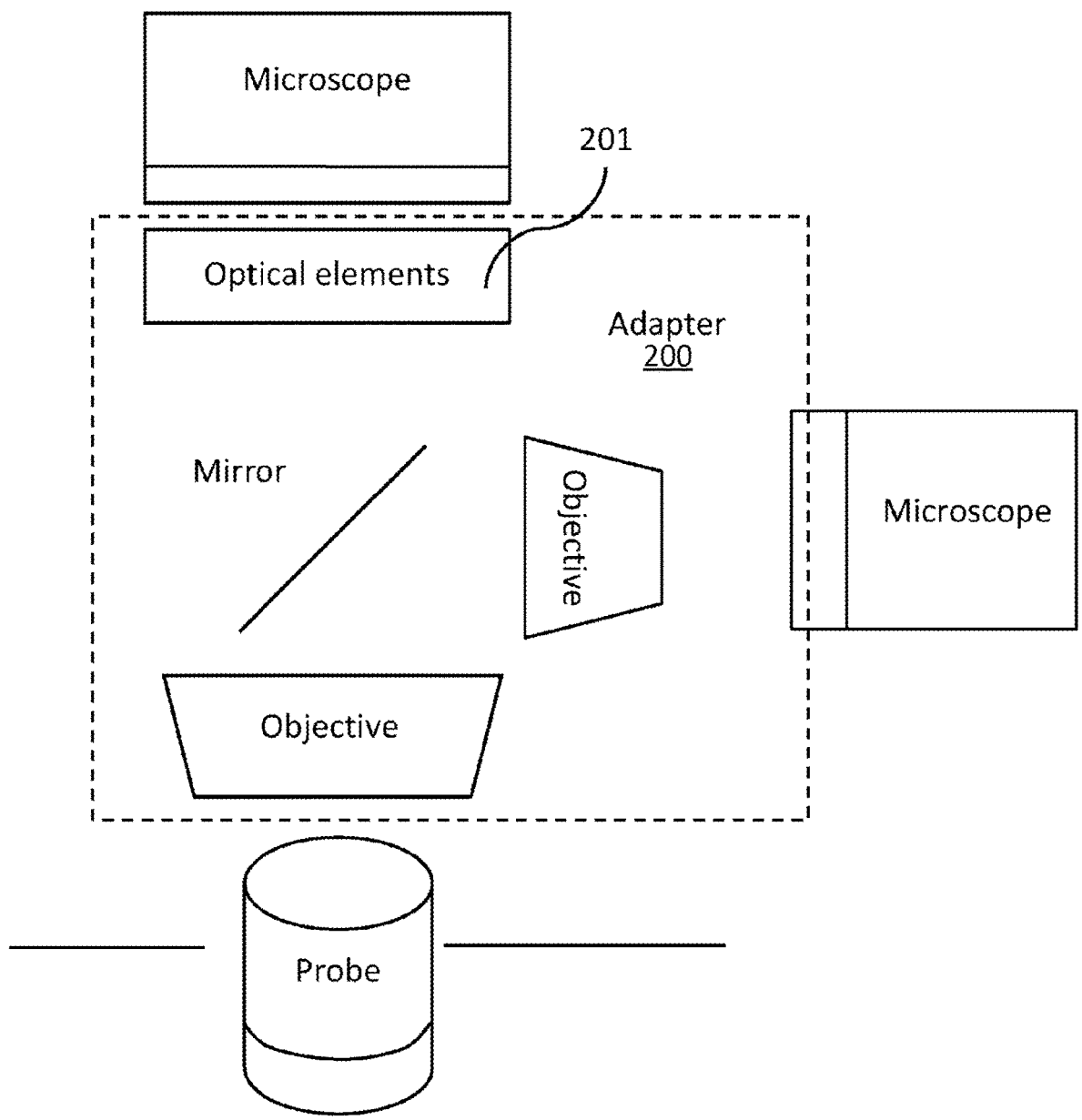
FIG. 2 shows an example of a schematic diagram of an adapter for use in microscopic imaging, wherein the adapter comprises additional optical components in accordance with embodiments of the invention.

FIGS. 1 and 2 show examples of a schematic diagram of embodiments of an adapter, 100 or 200.

Referring to FIG. 1, the adapter may include at least a first objective 104 and optical beam-splitter (in one instance—a partial reflector) 108 that are arranged to direct light between the constituent microscope system 110 (connected with the adapter via the interface 111) and/or the constituent microscope system 112 (connected with the adapter via the interface 113) of the overall apparatus employing the adapter. As shown in these examples, a given adapter may be optionally structured to not only include an objective 104 and/or an objective 106 of at least one of the constituent microscope systems) but also to be used together with an optical probe 102 (which, in turn, may be disposed to be in optical communication with the at least one of these objectives). As shown, for example, the optical probe 102 cooperated with the adapter via the interface 114 and the objective 104 are in optical alignment, i.e., their optical axes are substantially aligned. The probe 102 may be supported on and/or be partially inserted in and/or be at least partially implanted in a subject 101 (such as a predetermined biological tissue of a live organism) to image a target area 103 of the subject. The target area may include neural tissue of the subject, but may alternatively or in addition include any target area of the subject, e.g. muscle tissue, skin tissue, etc.

A portion of the optical assembly of the microscope system 100 may be positioned to be spatially aligned with the first objective lens and/or the probe 102 through a partial reflector (a mirror) and/or a beam-splitter 108, while a portion of the optical assembly of the microscope system 112 may be optically aligned with the optical probe 102 through the optical objective 10 and the reflector 108. Generally, the optical axes of the objectives 104, 106 are tilted with respect to one another.

In one specific case, the reflector 108 may be configured as a dichroic reflector to discriminate between light within a wavelength range from about 400 nm to about 500 nm and light within a wavelength range from about 500 nm to about 800 nm, or between light within a wavelength range from about 500 nm to about 650 nm and light within a wavelength range from about 350 nm and about 560 nm. In a related embodiment, the reflector 108 may be a dichroic reflector configured to pass infrared (IR) light delivered from a two-photon constituent microscope of the overall apparatus and reflect all of the excitation light provided by another constituent miniature one-photon fluorescence microscope of the overall apparatus An embodiment of the adapter (as shown in the example of FIG. 2) or a portion of a given constituent microscope system that is appended to and connected with the adapter via a corresponding interface may additionally include various additional optical elements (e.g., optical elements 201 as illustrated schematically in FIG. 2). The optical elements (or optical components) may include, but are not limited to, lenses or lens systems, optical filters, prisms, beamsplitters, dichroic reflectors, mirrors, optical fibers, diffractive optical elements for correction of chromatic aberration, etc., and may be configured as any of a number of optical arrangements known to those of skill in the art.

Multiple interfaces of the adapter (as shown—111, 113, 114) are judiciously structured to reversible/reusable attachment and dis-attachment (swapping in and out) of the corresponding device carried by the adapter at such an interface in a repeatable manner.

Generally, the optical probe 102 includes at least one GRIN lens. Optionally or in addition, the optical probe 102 may further contain a right angle prism and/or a corrective optical element configured correct an aberration caused by the GRIN lens, for instance (see the portion of the disclosure of the U.S. patent application Ser. No. 18/198,486 provided in reference to FIG. 7 thereof). A given corrective element may be present in between first and second constituent GRIN lenses of the optical probe 102 such as to form a stack of optical elements.

In one specific case, the optical probe 102 may be complemented with a cannula (e.g., a metal or glass cannula) at least partially implanted within the subject and within which the GRIN lens is fitted. In such specific case, the adapter housing is preferably structured to include a mechanical coupler dedicated to attach the cannula to the adapter (not shown). Such mechanical coupler may additionally be used to align the optical axis of the microscope and that of the GRIN lens probe.

When an implementation of the adapter of the apparatus includes a corresponding housing 105 (indicated by the dashed lines in FIGS. 1 and 2), such housing may partially or completely enclose one or more components of the adapter within the housing. Generally, the housing of the adapter is light-tight or substantially light-tight, and may have a volume and/or dimensions as discussed in the disclosure of the U.S. patent application Ser. No. 17/481,123.

As was already alluded to above, a constituent microscope system of the overall apparatus of the invention may be substantially any type of a microscope—such as a one-photon, epifluorescence microscope or a multi-photon microscope of a size, weight, dimension(s) and/or volume disclosed in U.S. patent application Ser. No. 17/481,123. The constituent microscope system may comprise various optical elements, e.g. lenses, electronic lenses, deformable lenses, tunable lenses, bandpass filters, long-pass filters, short-pass filters, dichroic reflectors, mirrors, beamsplitters, prisms, etc. as discussed, for example, in U.S. patent application Ser. No. 18/198,486. The microscope may comprise one or more image sensor arrays such as CCD or CMOS image sensors. Optionally, the microscope may comprise one or more light sources, e.g. LEDs, SLEDs, diode lasers, or fiber-coupled lasers.

Spatial resolution of multiple constituent microscopes (here, microscopes 110, 112) across a specified field of view may be judiciously chosen, for example, to ensure cellular or subcellular resolution imaging. In some instances, microscope 112 (and/or microscope 110) may be capable of imaging with a resolution of at least 0.1 um, 0.5 um, 1 um, 1.5 um, 2 um, 2.5 um, 3 um, 4 um, 5 um, 10 um, 20 um, 50 um, or 100 um at the center of the field of view and/or imaging with a resolution of at least 0.1 um, 0.5 um, 1 um, 1.5 um, 2 um, 2.5 um, 3 um, 4 um, 5 um, 10 um, 20 um, 50 um, or 100 um across the overall field of view. When at least one of the microscopes 110, 112 is configured to perform multicolor fluorescence imaging, the optical arrangement of such microscope may include (i) one or more light sources that provide excitation light at one or more wavelengths (or wavelength ranges), (ii) a first optical arrangement configured to deliver excitation light at the one or more excitation wavelengths (or wavelength ranges) to the sample or subject, (iii) a second optical arrangement configured to collect fluorescent light emitted by the sample of subject at one or more wavelengths (or wavelength ranges) from the sample or subject and form one or more images therefrom, and (iv) one or more image sensors to capture the formed image(s).

When at least one of the microscopes 110, 112 is configured for use in performing optogenetic studies, the optical system of such microscope may be structured to include (i) a portion of an illumination optical arm of the microscope that directs illumination light from an illumination light source to a chosen sample in a field-of-view of the microscope, (ii) a portion of a stimulation optical arm of the microscope that directs stimulation light from a stimulation light source to at least a portion of the chosen sample while the sample is illuminated by the illumination light, and (iii) an optical arrangement configured to direct both the illumination light and the stimulation light to the same area of the sample. In at least one specific case, such optical arrangement may be configured as an optical probe that is optically and/or mechanically coupled with the optical assembly through an interface of the first and second interfaces and that is configured to deliver the illumination light and the stimulation light to the sample without transmitting the illumination light and/or the stimulation light through a barrier/boundary of the sample. Alternatively or in addition, the optical system of such a microscope may additionally include a portion of an imaging optical arm that—when present—preferably includes an image sensor and is configured to receive an imaging light from the sample/subject to generate an image of the sample within the specified field-of-view.

Figure 3:
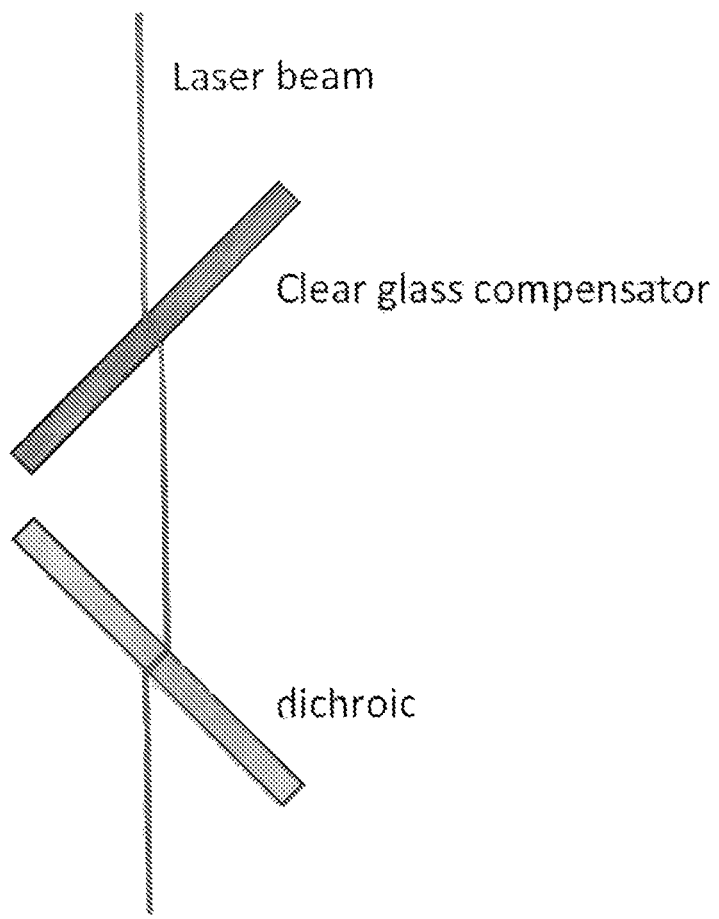
FIG. 3 provides a schematic illustration of the use of a compensator to correct for the beam displacement caused by passing a laser beam through a dichroic reflector, thereby improving the positioning accuracy of the laser beam when it impinges on a target region, e.g., a single cell, within the field-of-view of an imaging system of the present disclosure.

In some instances, such microscope systems designed for use in performing optogenetic studies may further comprise a compensator such as that illustrated in FIG. 3 to improve the positional accuracy of the stimulation light (e.g., a stimulation laser beam or collimated stimulation light produced by the stimulating light directing arrangement) as it impinges on a target region, e.g., a single cell or a selected group of cells, within the field-of-view of the microscope system. As indicated in FIG. 3, when, e.g., a laser beam passes through a dichroic reflector of the adapter, the beam may be displaced. This may result in a shift in the position of the beam relative to the sample within the field-of-view of the microscope system, and thus a loss of positional accuracy may occur when stimulating, e.g., single cells. As a skilled artisan will readily appreciate, to correct/compensate for this beam shift, a a clear glass plane-parallel-plate compensator oriented at a chosen angle with respect to the direction of the light beam may be used. Alternatively or in addition, the compensator may be constructed of the same material (e.g., an optical glass) or a material having the same index of refraction as the dichroic reflector so as to accurately compensate for the beam shift. In some instances, the compensator may have a different thickness and/or may be constructed of a different material than the dichroic reflector, and the compensator and dichroic reflector may be oriented at different absolute angles relative to the optical axis. In some instances, the compensator may be a fixed component of the adapter. In some instances, the adapter may comprise more than one compensator, e.g., the adapter may comprise two or more compensators to correct for beam shift of two or more laser beams or collimated stimulation light beams.

Another approach to the issue of correcting for beam shift may be to use a multi-position mirror holder (or multi-position filter holder) with the dichroic reflector and the compensator installed in two separate positions, e.g., a first position and a second position respectively. To calibrate the beam position using the adapter, one can position the compensator in the light path (e.g., position 2 on the multi-position mirror holder) and follow the beam calibration procedure on the multiphoton system. Then, one can switch to the dichroic mirror position (e.g., position 1 on the multi-position mirror holder) and follow up with photostimulation and imaging experiments using the adapter. The multi-position mirror holder may have any of a variety of configurations known to those of skill in the art, e.g., a rotary mirror (or filter) wheel, a linear slider, etc.

The adapter may be in optical communication with a microscope 110. In some instances, the adapter may be mechanically and/or optically coupled to microscope 110 via microscope interface 111. In some instances, the adapter may attach to microscope 110 in a manner that an objective would be attached. In some instances, the adapter may be optically coupled to microscope 110 via an optical fiber or liquid light guide. Alternatively, the adapter need not contact microscope 110. The mirror within the adapter may permit optical communication between the first objective 104 and the microscope. The adapter may function as an objective lens system for the microscope 110. Adapters with different mechanical and/or optical properties (e.g., having different objective lens focal lengths, numerical apertures, and/or mirror reflectance properties) may be attached and detached to microscope 110. Different adapters may be swapped for one another.

The microscope 110 may be any type of microscope, e.g., a wide-field epifluorescence microscope, multiphoton microscope, confocal laser scanning microscope, coherent Raman scattering microscope, etc. In some instances, the microscope 110 may be a two-photon microscope. Microscope 110 may be a benchtop or miniature microscope. Examples of suitable, commercially-available microscopes for use as microscope 110 include, but are not limited to, the Neurolabware (Los Angeles, CA) Resonant Scanning Two-Photon Microscope, the Intelligent Imaging Inovations (Denver, CO) Vivo 2-Photon System, and systems available from Bruker (Billerica, MA), Olympus (Waltham, MA), Thorlabs (Sterling, VA), Scientifica (East Sussex, UK), Zeiss (Thornwood, NY), or Leica Microsystems (Buffalo Grove, IL), etc. The adapter may also be used with custom-built two-photon microscopes, confocal laser scanning microscopes, etc.

In some embodiments, imaging of the target region 103 may be performed using light that is reflected, scattered, transmitted, or emitted by the sample or tissue within target region 103. In some instances, the light may emanate from the target region itself. Alternatively or in addition, light may be transmitted to the target region through the probe 102. The light provided through the optical probe may be at a near UV wavelength, visible wavelength, infrared wavelength, or any wavelength that may stimulate fluorescence at the target region. The light may be provided from an ambient environment, or a light source on-board, e.g., a two-photon microscope 110, another microscope 112 such as a one-photon microscope, and/or the adapter 100 itself. The light source may optionally be an LED light source. The light source may optionally be a laser. In some instances, the light may optionally be coupled with the adapter or microscopes by means of an optical fiber. Light delivered to the target region by the probe may be reflected or scattered from the target region and transmitted back through a GRIN lens of probe 102. Alternatively, the light collected from the target region and transmitted back through a GRIN lens of probe 102 may be light, e.g. one-photon fluorescence, two-photon fluorescence, or second harmonic light, that has been excited within the target region by the light transmitted to the target region by probe 102.

In one example, a microscope 112 may be directly coupled to an optical probe 102. The microscope may be mounted to the probe and/or a mounting structure, e.g., a baseplate. The microscope 112 may be a miniature microscope that is capable of being carried by the subject while the subject is freely moving. The microscope may be used to image the target region without use of the adapter. The microscope may then be removed from the probe, and the adapter may be attached to the probe. The microscope 112 may be attached to the adapter. In some instances, the adapter may be configured to fully or partially support microscope 112. Attachment of microscope 112 to the adapter may permit the microscope 112 to still be used for imaging the target region of a subject (while immobilized or freely moving), while also allowing another microscope 110 to image the target region (typically, after immobilizing the subject relative to the position of microscope 110). Such images may be viewed in parallel at the same time, or may be viewed sequentially. In some instances, an adapter may be used initially for imaging. The adapter may then be removed and then the microscope 112 may be directly attached to the probe. Different adapters may be swapped out. The different adapters may have different mechanical and/or optical properties, such as different objective lens focal lengths, numerical apertures, and/or mirror reflectance properties. The adapter may be an attachment that provides additional flexibility to the imaging system. In some instances, the adapter may be small and/or light weight enough that it is fully or partially supported by microscope 110. In some instances, the adapter may function as the objective for microscope 110, and may be used to image a live subject that has been immobilized relative to the position of microscope 110. In some instances, the adapter(s) may couple one microscope 110 to one or more microscopes 112 with different optical imaging properties. In some instances, the adapter(s) may couple one microscope 110 to two or more microscopes 112 with different optical imaging properties. For example, the adapter and/or mirror within the adapter may be used to direct light to multiple microscopes (e.g., miniature microscopes) with different optical filter sets. Optionally, the adapter(s) may couple one microscope 110 to three, four, five, six, seven, eight, nine, ten or more microscopes 112 with different optical imaging properties. The different optical imaging properties for the different microscopes may comprise, e.g., different imaging fields-of-view, different imaging resolutions, different fluorescence excitation wavelengths or wavelength ranges, different fluorescence emission wavelengths or wavelength ranges, etc.

As noted above, in some instances, the adapter may comprise a focusing mechanism used to align the focal plane of microscope 110 and the one or more microscopes 112. In order to align the focal plane of the two (or more) microscopes, a test target is imaged using, for example, a two-photon microscope (110) and then the focusing mechanism of the adapter is adjusted such that microscope 112 will focus on the same target. In other instances, the focusing mechanism of microscope 112 is used to focus on the test target. The disadvantage of the latter procedure is that the optical settings (e.g., magnification, FOV) of microscope 112 may change during focusing. This may make it harder to compare images, e.g., images of a freely behaving subject with two photon images collected for the same subject.

As described above, the microscope 112 may be sized and/or shaped to be carried by the subject. For instance, the microscope may be a miniature microscope that may be carried by a rodent, such as a mouse, while the rodent may move about. A miniature microscope may also be referred to as a miniscope. For instance, the rodent may walk freely about while supporting a miniature microscope. The adapter may or may not be sized and/or shaped to be carried by the subject. For instance, the adapter may be a miniature component that may be carried by a rodent, such as a mouse, while the rodent moves about. The adapter may have any dimensions described for the microscope. The adapter may be larger than, smaller than, or have substantially equal size to the microscope. Alternatively, the adapter need not be so portable. The adapter may optionally be used when the sample or subject, or a target region of the sample or subject, is substantially immobilized. The adapter may be used when a sample or subject, or target region of the sample or subject is affixed. For instance, a rodent's head may be affixed.

In some instances, the adapter may be used connect two or more microscopes of the same or different type to a single optical probe, thereby enabling multimode imaging of a sample or subject. For example, microscope 112 may be a miniature epifluorescence microscope and microscope 110 may be a conventional bright field microscope, thus permitting simultaneous imaging of the sample or subject with accurate alignment of the two images. As another example, microscope 112 may be an miniature optogenetic microscope (e.g., a microscope comprising at least two light sources for imaging and photostimulation), while microscope 110 may be a one-photon or two-photon fluorescence microscope operating at a different fluorescence emission wavelength, thereby allowing simultaneous imaging of neuron activation and fluorescently-tagged biomarker distribution within a common field of view. In instances where microscope 112 is a miniature optogenetic microscope, the adapter may further comprise a compensator, as described above and depicted in FIG. 3 (e.g., a fixed compensator or a multi-position mirror holder that comprises a dichroic reflector in a first position and a compensator in a second position), to compensate for beam shift and improve the positional accuracy of the optical stimulation of single cells or other targets within the field-of-view.

In some instances, the adapter thus facilitates, for example, the correlation of image data collected for freely-behaving subjects (using microscope 112) with structural, subcellular resolution image data collected using a two-photon (microscope 110). That is, the adapter facilitates comparison of images collected on two different length scales (cellular and subcellular).

In some instances, microscope 112 may be a fluorescence microscope, e.g., a miniature epifluorescence microscope), and microscope 110 may be a two-photon laser scanning microscope, or component thereof, used to provide photostimulation of optogenetically-modified neuronal tissue. In some instances, just the excitation light source for the two-photon microscope, e.g., a laser, may be used in conjunction with the adapter and microscope 110. In some instances, a laser light source or two-photon laser scanning microscope connected to interface 114 of the adapter may be used to provide a train of temporally focused laser pulses, for which axial beam profile may be controlled independently of lateral intensity distribution, to allow fast and selective excitation of individual optogenetically-modified neurons, or sub-cellular compartments thereof. In those instances where microscope 110 is a two-photon laser scanning microscope, or component thereof (e.g., a laser light source), the adapter may further comprise a compensator, as described above and depicted in FIG. 3 (e.g., a fixed compensator or a multi-position mirror holder that comprises a dichroic reflector in a first position and a compensator in a second position), to compensate for beam shift and improve the positional accuracy of the optical stimulation of single cells or other targets within the field-of-view.

In some instances, microscope 112 may be a bright-field or fluorescence microscope used for imaging a sample, e.g., a tissue sample, while microscope 110 may be a one-photon or two-photon microscope, e.g., a microscope comprising a scanning laser or patterned excitation light system, used to trigger a light-activated, CRISPR-based transcription system (e.g., the light-activated CRISPR-Cas9 approaches recently described by Nihongaki, et al. (2015), "Photoactivatable CRISPR-Cas9 for Optogenetic Genome Editing", Nature Biotechnology 33, 755-760; and Polstein and Gersbach (2015), "A Light-Inducible CRISPR-Cas9 System for Control of Endogenous Gene Activation", Nature Chemical Biology 11:198-200) for performing light-controlled genome editing in precisely defined subsets of cells, e.g., neurons, in a tissue sample. For example, in some instances microscope 110 may be used to trigger a light-activated, CRISPR-based transcription system for inserting, activating, and/or expressing nucleic acid sequences coding for channelrhodopsins (or other light-activated ion channels and ion pumps) and/or genetically-encoded calcium indicators (e.g., GCamPs) in selected neurons within a field of view, and microscope 112 may be configured to provide both photostimulation light for activating channelrhodopsin, thereby exciting the selected neurons, and imaging light for exciting GCamP fluorescence, thereby enabling imaging of neuronal signaling. In some instances, microscope 110 may be a one-photon or two-photon microscope used to trigger a light-activated Cre recombinase transcription system (Edwards, et al. (2009), "Light-Activated Cre Recombinase as a Tool for the Spatial and Temporal Control of Gene Function in Mammalian Cells", ACS Chem. Biol. 4(6):441-5). In these instances, the adapter may further comprise a compensator, as described above and depicted in FIG. 3 (e.g., a fixed compensator or a multi-position mirror holder that comprises a dichroic reflector in a first position and a compensator in a second position), to compensate for beam shift and improve the positional accuracy of the optical stimulation of single cells or other targets within the field-of-view.

In some embodiments, the adapter may be used to support a microscope that could be used to capture images from a freely moving subject, as well as a microscope that can be used to capture images from an affixed subject. For instance, an adapter and/or image alignment method as described further herein may be used to allow for freely moving imaging by a miniature microscope and head-fixed imaging by a broad imaging modality that requires head fixation of subjects. The adapter may aid in supporting microscopes that may allow for capturing images using two or more different modalities.

In some instances, the accuracy of alignment/registration of images collected or video data recorded using microscopes 110 and 112, which are optically and/or mechanically coupled using the disclosed adapter may be further enhanced using an appropriate image alignment/registration algorithm to process the data following image acquisition. Images and/or video data may be captured or recorded using any of a variety of digital cameras (e.g., CCD cameras, CMOS cameras, etc.) that are attached to or incorporated into microscopes 110 and 112, and image acquisition and processing software (e.g., ImageJ (National Institutes of Health, Bethesda, MD), Cell Profiler (the Broad Institute, Cambridge, MA), Icy (Institut Pasteur, Paris, France), LabVIEW (National Instruments, Austin, TX), MatLab (Mathworks, Natick, MA), etc.) known to those of skill in the art. A typical image acquisition workflow for use with the disclosed adapter and microscope imaging systems is illustrated in Example 1 below. A typical image registration workflow for use with the disclosed adapter and microscope imaging systems is illustrated in Example 2 below.

In some instances, operational parameters such as the adjustment of focus for microscopes 110 and/or 112 are performed manually prior to the start of image acquisition. In some instances, the setting of operational parameters such as focus adjustment may be facilitated through the use of real-time (i.e., "live") image acquisition and processing. For example, one application of the disclosed adapter is to compare image and/or video data captured for head-fixed and freely-behaving test subjects, e.g., laboratory animals. To facilitate the ability to focus on specific features and landmarks within the field-of-view during one-photon imaging, a real-time bandpass filter may be implemented that removes background signal and high frequency noise, and stretches the image contrast to facilitate focusing. Note that one-photon images are typically dominated by a bright background which impedes efficient focusing by visual feedback. The real-time image processing functionality (i.e., "live" bandpass filtering of a series of one-photon images) makes it easier to find specific features and landmarks in the specimen that is being imaged. Especially in low brightness images, the use of live filtering can help resolve landmarks and features that are otherwise indistinguishable from the background.

Figure 4:
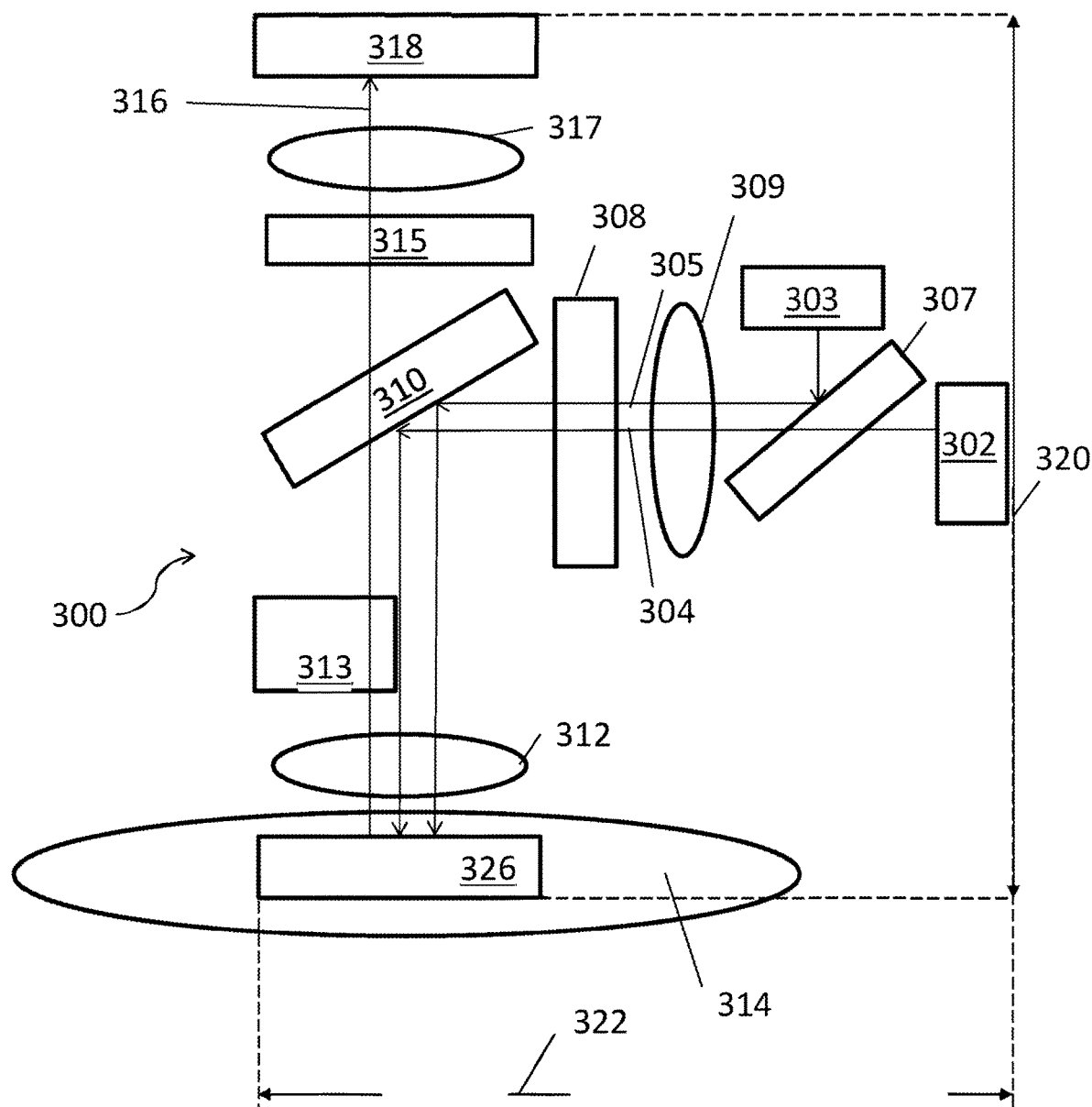
FIG. 4 shows a schematic diagram of an example of a microscope that may be coupled to the adapter to form at least a portion of the apparatus structured according to the idea of the invention.

FIG. 4 schematically illustrates an example 300 of an optical assembly of the microscope system that may be coupled to the adapter discussed herein. (Notably, this embodiment 300 directly corresponds to the optical assembly of the optogenetic microscope system discussed in reference to FIG. 1 of U.S. patent application Ser. No. 18/198,486. The embodiment 300 is shown to include a plurality of optical elements (e.g., lenses, filters, mirrors, dichroics, etc.) within and/or integrated with the housing (with overall dimensions 320 and 322, which, depending on the specifics of the particular implementation, differ from about 0.5 inch to about 3 inches) for imaging of a target object 314. In particular, The optical elements can include a first optical arrangement 302 (e.g., light sources, diodes, fiber optics) structured to generate first excitation light 304, a second optical arrangement 303 (e.g., light sources, diodes, fiber optics) structured to generate a second excitation light 305, a light source combining element 307 (e.g., dichroic filter), a condenser lens 309, an excitation filter 308 (e.g., short pass filter, band pass filter), an objective lens 312, (dichroic beam splitter) mirror 310. While the embodiment 300 is explicitly shown to combine only first and second optical arrangements (which, in the example of FIG. 1 of U.S. patent application Ser. No. 18/198,486 represent the illumination and stimulation optical arms), it is to be understood that generally a plurality (e.g., two, three, or more) of optical arrangements may be included in such optical assembly.

The light 316 emitted from the target within the field-of-view 326 object is generally directed by the objective lens 312 through the emission filter 315 and the tube lens 317 to an image capture circuit 318. The emission filter 315 is generally configure to prevent light having wavelength(s) in one or more predetermined wavelength ranges from being transmitted to the image sensor/image capture circuit 318 while, at the same time, transmitting light in one or more image wavelength ranges to be transmitted to the image sensor. The tube lens 317 is generally structured to focus light from 316 onto the image sensor and/or to facilitate correction of at least spherical and/or chromatic aberrations.

The microscope system 300 may be configured to direct light from and capture image data for a field of view 326. The optical assembly 300 can additionally include one or more optical elements (e.g., filters) 313 configured to prevent or reduce chromatic aberrations. (For details, see the discussion in reference to FIG. 7 of U.S. patent application Ser. No. 18/198,486.) In some embodiments, the microscope system 300 can be configured to support wireless communication (e.g., via a wireless adapter). The wireless communication can be via a radio frequency or optical link. For example, one or more images captured by the microscope can be wirelessly communicated to an external processor communicatively coupled to a memory with instructions to receive the one or more images.

Figure 8:
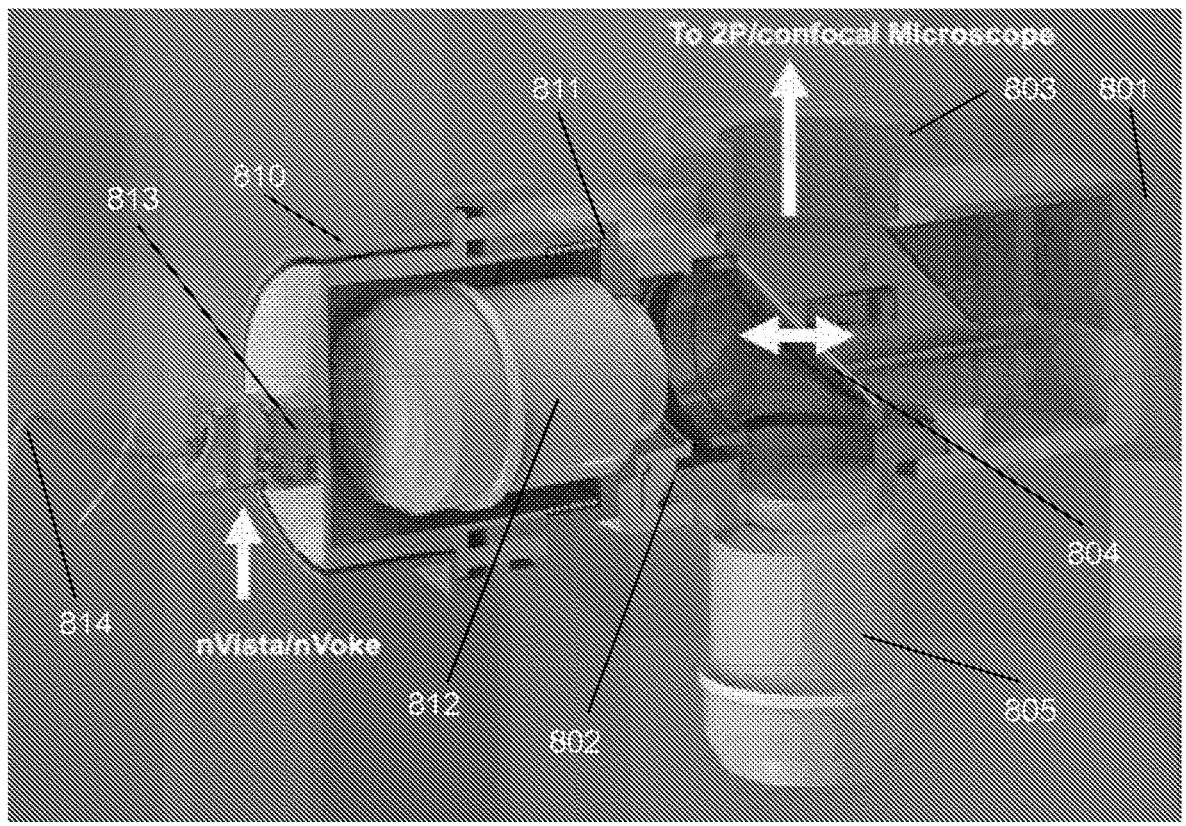
FIG. 8 depicts an example of an adapter with a first microscope coupled to the adapter, and an interface for a second microscope.

FIG. 8 shows an example of an adapter with a first microscope coupled to the adapter, and an interface for a second microscope. An adapter 800 is shown to include a first interface 802 configured to receive and support at least a portion of a first microscope system 810 (for example, a one-photon microscope system marked here as nVista™/nVoke™), a second interface 803 configured to receive and support a second microscope system (here, a multi-photon/confocal microscope system, the location of which is indicted by an arrow), and a third interface carrying the optical probe (shown here as 805). The first interface is at least transverse and preferably substantially perpendicular to the interface engaging the optical probe 805. The first microscope may be supported so that a microscope body is substantially perpendicular to an optical probe body. The adapter 800 is judiciously structured to ensure that the component 812 (which is an objective lens or another portion of the optical arrangement of the first microscope system) has a viewing axis substantially perpendicular to an optical axis defined by the optical probe while the viewing axis of the second microscope is substantially parallel and/or substantially coincident with the optical axis defined by the optical probe 805.

The optical element 804 of the adapter 800 denotes a mirror, a dichroic optical element such as element 108 of FIG. 1 configured to redirect a corresponding portion of the imaging light collected by the probe 805 towards the first and second microscopes.

The first microscope 810 is shown to include an attachment interface 811 that may allow the first microscope to connect to the adapter 801. The attachment interface may come into contact with a first interface 802 of the adapter 800. The microscope interface 811 may mechanically connect to the adapter interface in a repeatable manner. For example, the interfaces may screw in together, be press-fit, have a snapping feature, having a locking and twisting feature, or any other mechanical feature that may allow the microscope to be attached to the adapter and/or separated from the adapter. The interfaces may come together firmly so that there is little or no wiggling of the microscope with respect to the adapter. An optical component 812 of the first microscope may have a fixed position and/or orientation relative to the adapter when the first microscope is attached to the adapter. Alternatively, the lens may be adjustable in a controlled manner One or more opto-electronic component 813 may be provided on-board the first microscope. For instance, one or more image sensors, light source, circuit board (e.g., PCB) may be provided. One or more connector 814 may optionally be provided for conveying power, light, and/or data. The connector may convey power, light, and/or data to and/or from the microscope. Similar configurations may be provided between the second microscope and the adapter.

Figure 5:
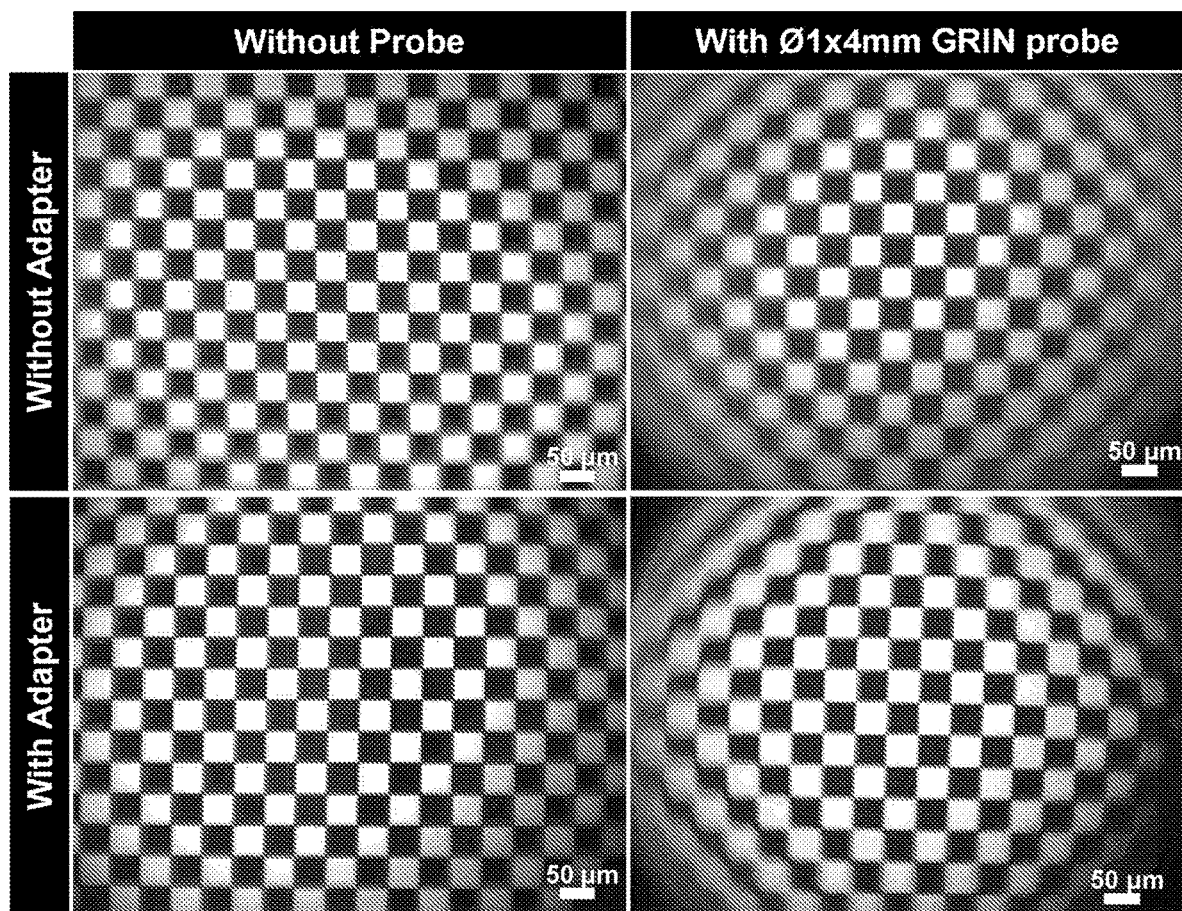
FIG. 5 shows examples of images of a 50 μm pitch test target captured using a miniature microscope with or without use of a 1 mm diameter GRIN probe, and with or without use of an embodiment of the disclosed adapter.

FIG. 5 provides examples of images of a 50 μm pitch test target captured with the use of a miniature microscope with or without use of a 1 mm diameter GRIN-lens based probe 805, and with or without the use of the embodiment 800 of the adapter. As can be seen, inclusion of the adapter 800 in the optical path of the imaging microscope system does not worsen the quality of the images captured by the miniature microscope while, at the same time, allows for simultaneously capture of images with yet another constituent microscope system.

Figure 6:
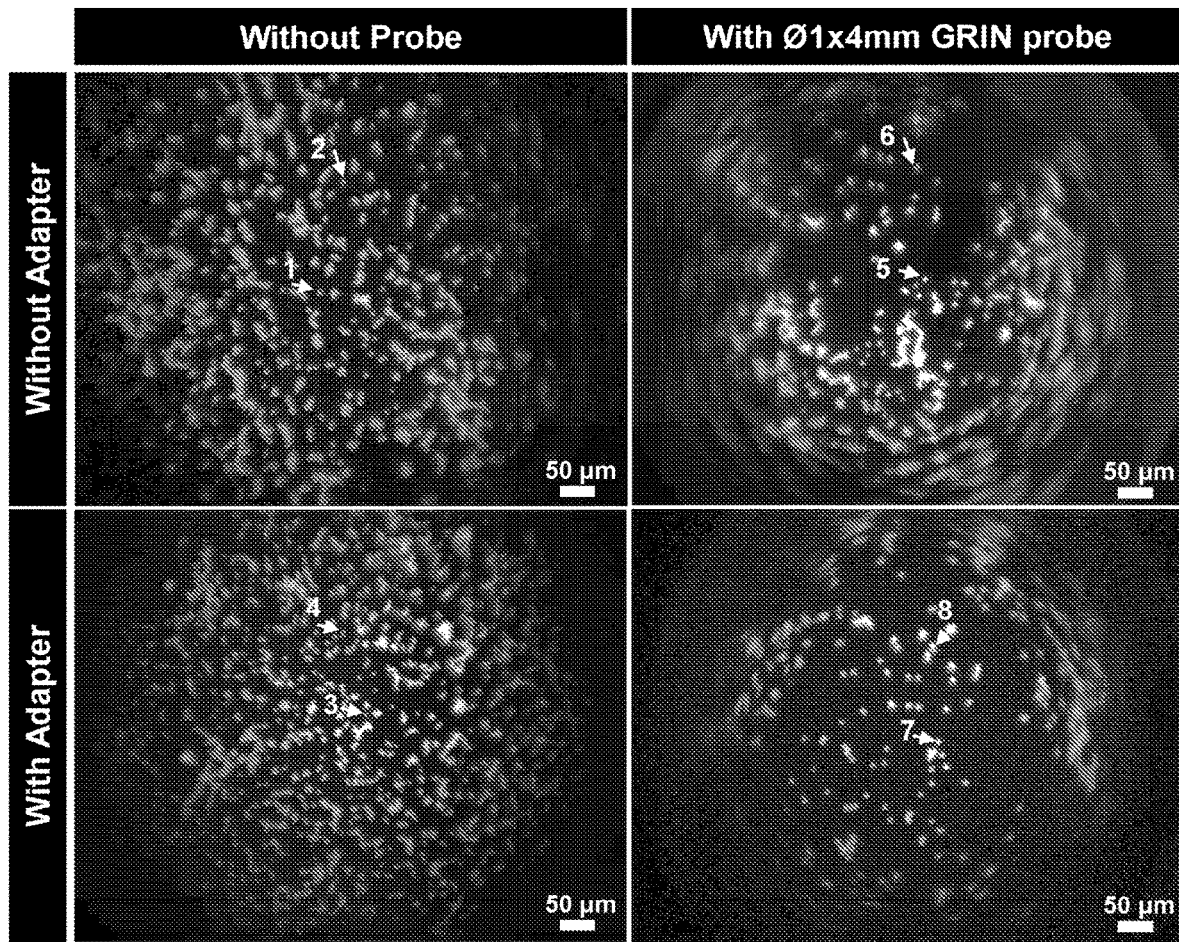
FIG. 6 shows examples of images of 7 μm diameter Dragon Green fluorescent beads captured using a miniature microscope with or without use of a 1 mm diameter GRIN probe, and with or without use of an embodiment of the disclosed adapter.

FIG. 6 provides examples of images of 7 μm diameter Dragon Green fluorescent beads captured using a miniature microscope with or without use of a 1 mm diameter GRIN-lens-based probe, and with or without use of the disclosed embodiment of the adapter. As can be seen, inclusion of the adapter in the optical path had little or no deleterious effect on the quality of the images captured by the miniature microscope.

Figure 7:
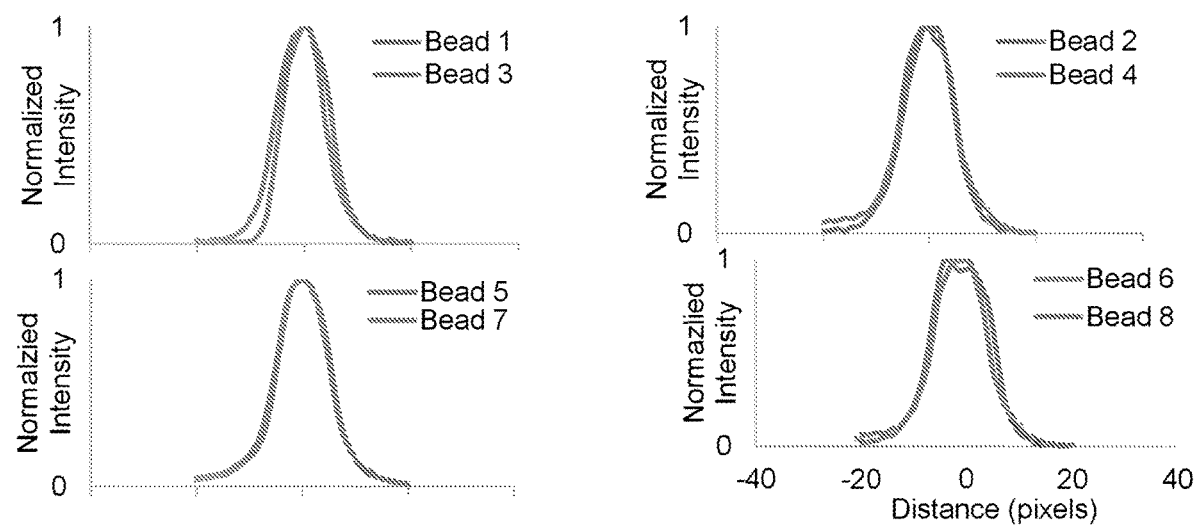
FIG. 7 presents examples of normalized fluorescence intensity plots of the beads indicated in each of the images in FIG. 6.

FIG. 7 shows examples of normalized fluorescence intensity plots of the beads indicated in each of the images in FIG. 6. As can be seen, the normalized intensity profiles for beads imaged with or without the use of the adapter are substantially identical, indicating that there is essentially no image distortion introduced by inclusion of the adapter in the optical path.

In some embodiments, systems and methods may be provided for multi-modal imaging. Multi-modal imaging may be enabled by use of an adapter as described herein. The multi-modal imaging may allow images from a first microscope and a second microscope configured to be interfaced with the adapter to be processed and displayed in a desirable manner. For example, images captured by microscopes of different types may be displayed separately or together. For example, images captured by a one-photon microscope may be displayed together with images captured by a two-photon and/or confocal microscope. Images captured by the different microscopes may be overlaid. In some instances, image-processing steps may be provided to allow the images to be overlaid in a meaningful manner Functional and structural images may be combined in the overlaid images. In some instances, functional imaging may be used to image physiological activities. For instance, changes in metabolism, blood flow, regional chemical composition, or absorption may be detected or measured. In some instances, tracers or probes may be used to aid in functional imaging. Functional imaging may be used to diagnose metabolic diseases and lesions on a finger scale, and/or for neurological and cognitive psychology research. Structural imaging may deal with the structure of tissues and/or organs, such as structure of the nervous system. The structural imaging may be useful for diagnosis of intracranial disease and/or injuries. Functional and structural imaging may be used in conjunction to provide a robust image of the underlying structure and/or activity, such as brain imaging.

Figure 9:
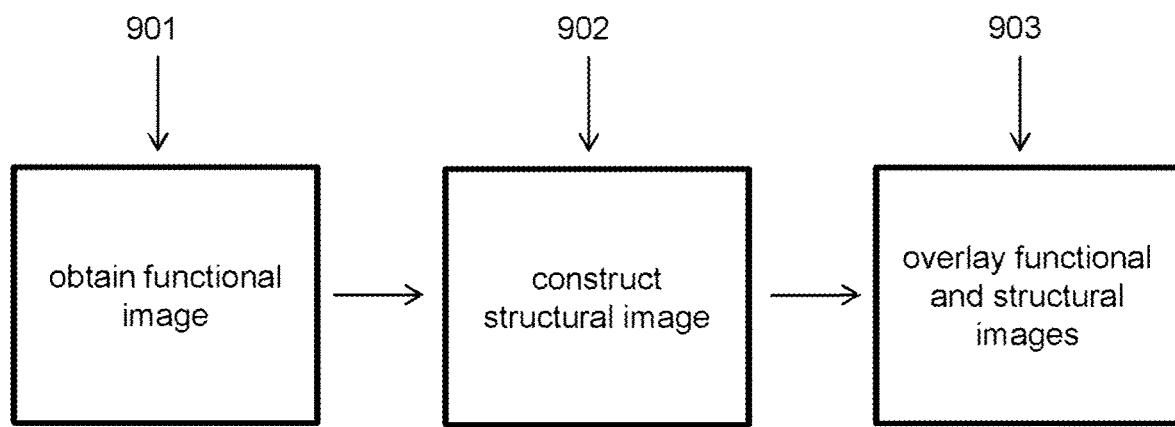
FIG. 9 illustrates an example of a process for multi-modal imaging using functional data and structural data from a microscope.
Figure 10A:
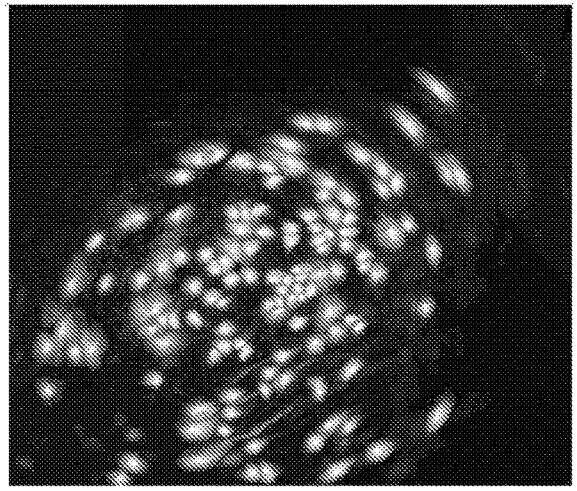
FIG. 10A shows an example of a functional image.

FIG. 9 schematically illustrates an embodiment of a process of multi-modal imaging, in which initially functional imaging data is procured with an embodiment of the system of the invention (containing the adapter and a constituent microscope system coupled to the adapter, as discussed above) at step 901. An example of the functional image—such as that representing a map of the cell—is presented in FIG. 10A. The cell map may be obtained with the aid of an Inscopix Data Processing Software (IDPS), and may have undergone at least one or more of the following: preprocessing, motion correction, cell identification.

Figure 10B:
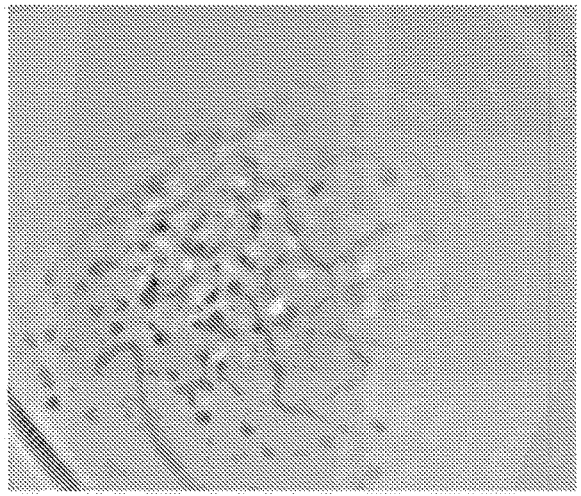
FIG. 10B shows an example of a structural image.

From the empirically acquired functional imaging data, a structural image may further be constructed at step 902. The structural image may be a mean projection of a motion-corrected movie, or a maximal projection of a static z-stack images. The movie may be taken with aid of a microscope supported by the adapter, as described elsewhere herein. The microscope may be a 1-photon microscope or any other type of microscope. The motion corrected movie may or may not include the functional image that was taken. An example of a structural image is shown in FIG. 10B.

Depending on the specifics of a particular implementation, the functional and structural images may be captured and/or processed sequentially or in parallel. Any order of image capture and/or processing may be provided.

Figure 10C:
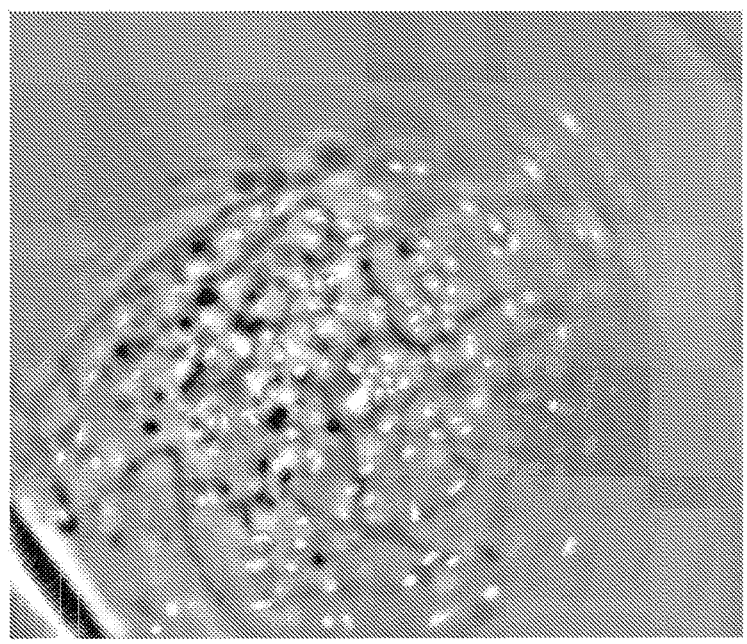
FIG. 10C shows an example of an overlaid image using the functional and structural image.

In at least one implementation of the method, the functional image and the structural image are spatially overlaid with one another (see 903). An example of the resulting overlaid image is shown in FIG. 10C. In some embodiments, adjustments may be made to overlay the images. Corresponding features in images being overlaid may or may not be recognized and necessary transformations to the images may or may not be undertaken.

Figure 11:
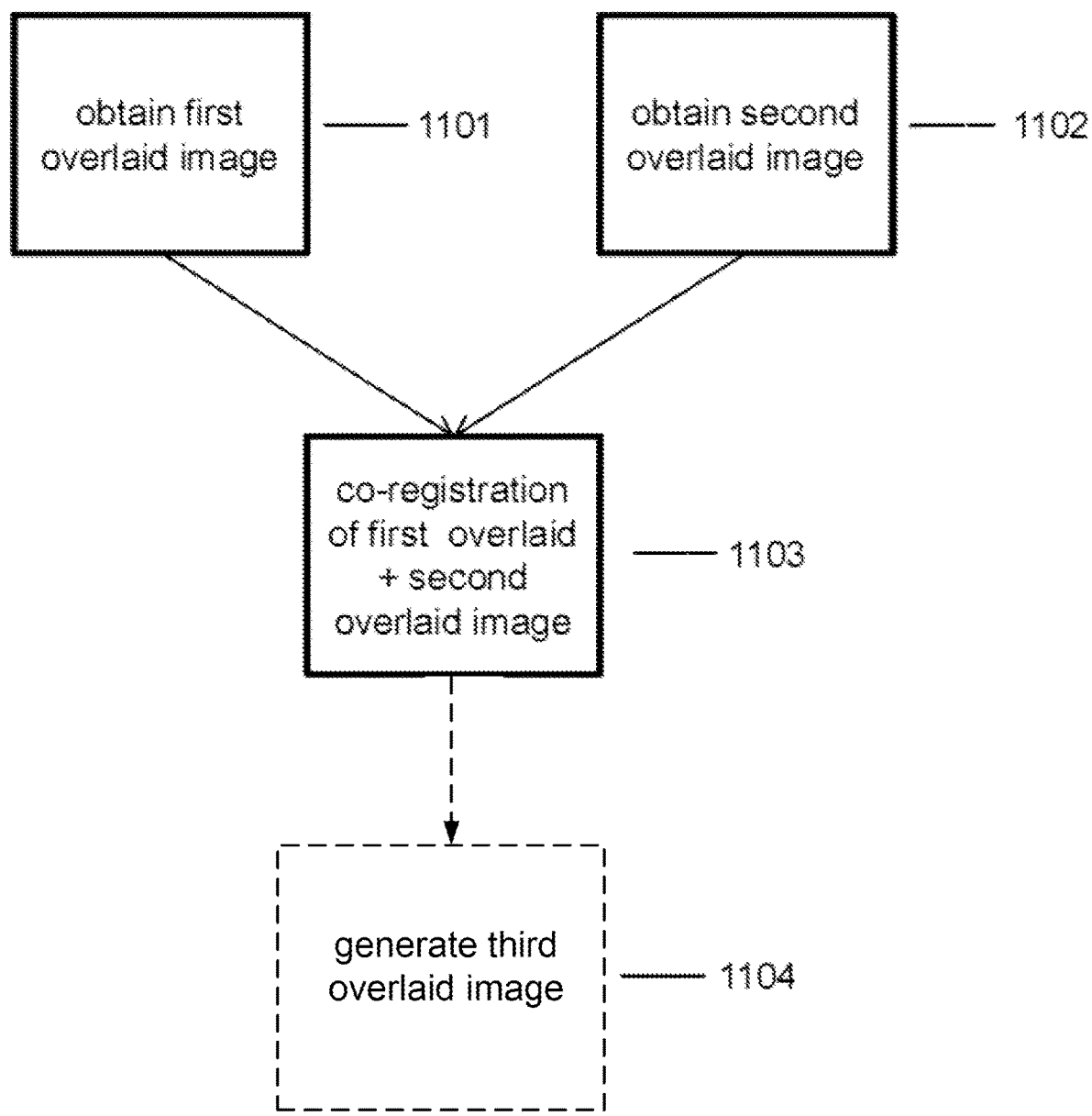
FIG. 11 schematically illustrates an embodiment of a process for multi-modal imaging using images acquired with a first microscope and with a second microscope of a disclosed apparatus.

FIG. 11 shows a process for multi-modal imaging registration, which is carried out with the resulting overlaid image (such as that of FIG. 10C). Here, a first overlaid image 1101 may be initially obtained with the process of FIG. 9—for example, with the use of a portion of the embodiment of the imaging system of the invention employing the imaging arm containing a one-photon microscope coupled to the adapter of the invention, as discussed above. At the same time—in sequence or in parallel—with the use of another arm of the imaging system containing a multi-photon microscope (in a specific example—a two-photon (2p)/confocal constituent microscope) coupled to another interface of the adapter of the invention—the multi-photon/confocal data may be processed to obtain an overlaid multi-photon/confocal image (interchangeably referred to herein as a second overlaid image) 1102. Thereafter, co-registration of the first overlaid image and the multi-photon/confocal image is performed 1103. Additionally and generally optionally (which is emphasized by a dashed line of the block 1104 in FIG. 11), a specific embodiment may be complemented by generation of a third overlaid image, as discussed in more detail below.

Processing of the multi-photon/confocal data deserves additional discussion, for the purposes of which a specific non-limiting case of processing the 2p/confocal data is considered.

Processing of 2-photon/confocal data may include obtaining a structural imaging data (see step 902 of FIG. 9), which may be read to obtain a z-stack. In one example, for Zeiss .czi data, an open source python API may be utilized. A number (n) of z-layers may be chosen. The number (n) of layers may be chosen to generate a maximal (or improved) projection of the structural image that may cover a chosen thickness of tissue. For example, the chosen thickness of tissue may be greater than, less than, or approximately equal to about 10 um, 15 um, 20 um, 25 um, 30 um, 35 um, 40 um, or 50 um. The chosen thickness may match a focal depth of an image captured by a microscope described elsewhere herein. If the total z-stack is larger than the chosen thickness (e.g., any of the values described herein), a series of projection images may be generated with a sliding window of size (n). These series of projection images may be navigated to identify the image with obvious landmarks (or landmark features—such as e.g., blood vessels or other structures, when the image at hand is that of a biological tissue) that best resembles those in the structural image.

Figure 12A:
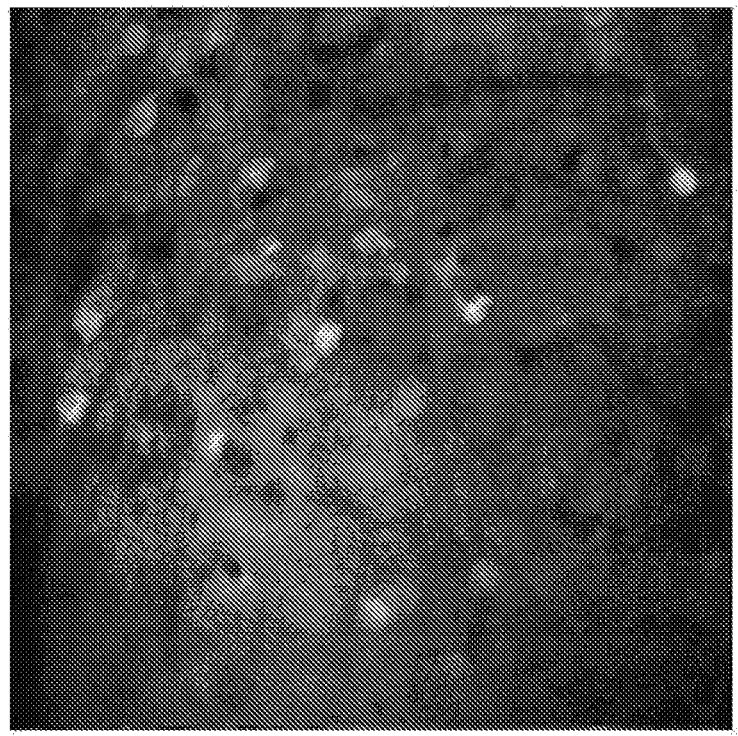
FIG. 12A shows an example of an image that may be selected from the series of projection images.

FIG. 12A shows an example of an image that may be selected from the series of projection images. Such image selection may be made manually. For instance, a user may view the series of images and select the image. In some instances, the image selection may be made with one or more image analysis algorithms. The image analysis algorithms may analyze the series of pictures and select the image based on one or more criteria. One or more processors may aid in the analysis of the images.

Figure 12B:
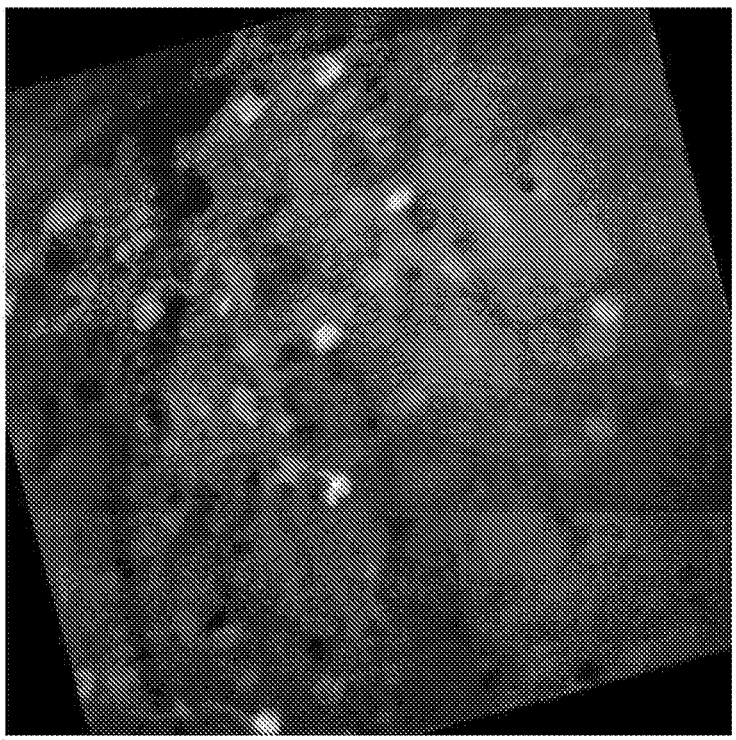
FIG. 12B is an example of a two-photon (2p)/confocal structural image that has been re-oriented to match a first structural image.

An estimated flip/rotation may occur between a first microscope structure image and a 2p/confocal structural image. Such an estimated transformation (T) may be applied to the 2p/confocal structural image. Effecting the transformation to the 2p/confocal structural image may cause it to be of the same orientation as the first structural image used in the first overlaid image. The first structural image and the 2p/confocal image may then be at the same orientation. They may or may not have some differences in scale, elastic deformation, or require some fine translation. FIG. 12B shows an example of the 2p/confocal structural image that has been re-oriented to match the first structural image.

Processing of 2-photon/confocal data may include obtaining a corresponding functional image. The functional data may have any format, such as a movie (e.g., video file). The format of the functional data may be converted as desired. For instance, the functional data may be converted from a movie to an .isxd movie, .tiff sequence, or a .hdf5. In some instances, the functional data may be initially presented in a desired format and may not require format conversion. The functional data in a desired format may be a functional recording.

A functional image processing pipeline may be used to get a cell map for each functional recording. The image may have undergone one or more of the following: preprocessing, motion correction, cell identification, light balancing, and so forth. If multiple functional recordings at a sequential depth exist, each functional recording may be processed one by one (e.g., sequentially). The functional recordings may be processed one by one if the multiple functional recordings are not products of simultaneous volumetric functional image.

Figure 13A:
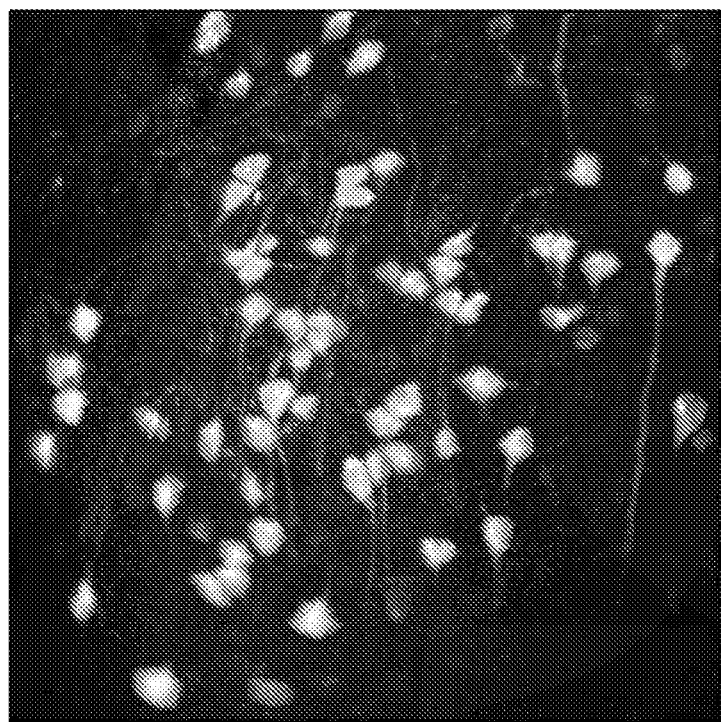
FIG. 13A shows an example of a functional cell map.

The cell maps may be registered. The registered cell maps may be padded into the same size (e.g., may be converted to be the same as needed). The various cell maps may be projected into a single functional cell map. For instance, the cell maps obtained from each functional recording may be projected into a single functional cell map. FIG. 13A shows an example of a functional cell map.

The transformation (T) that was utilized when transforming the 2p/confocal structural image may be used to transform the functional cell map. Thus, the functional cell map may be reoriented in the same manner as the reorientation of the 2p/confocal structural image was discussed above. The transformation (T) that was utilized when reorienting the 2p/confocal structural image may be stored, and may be accessed when determining how to orient the functional cell map.

Figure 13B:
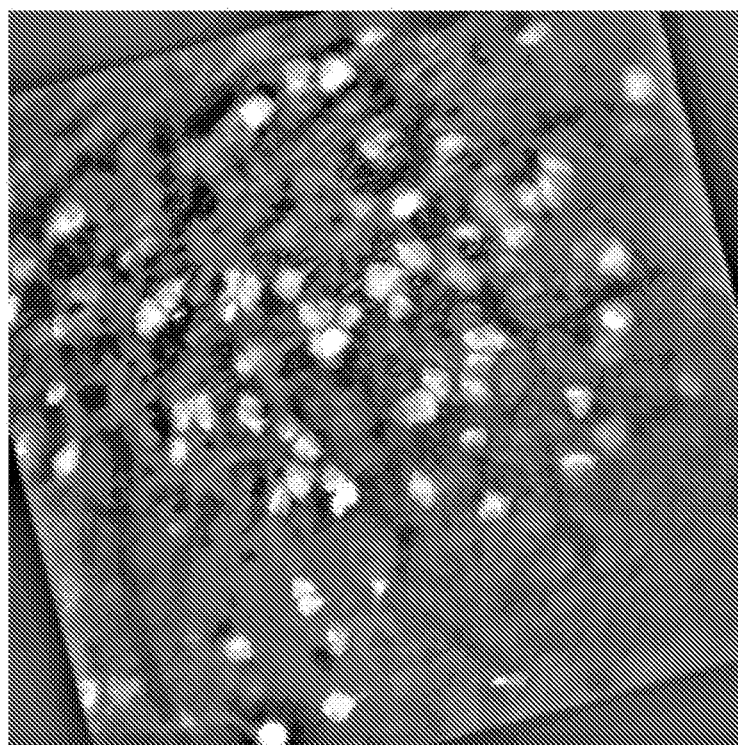
FIG. 13B shows an example of a functional and structural overlaid two-photon/confocal image.

The 2p/confocal structural image may have a higher resolution than the functional cell map. Alternatively, these two images may be of similar resolutions, or the functional cell map may have a higher resolution. The 2p/confocal structural image may be resealed to be the same size as the functional cell map, or vice versa. The re-scaling may be needed in order to overlay the images. If any distortions need to be removed, or if any translations are needed, these may occur as well, to allow for overlay of the images. FIG. 13B shows an overlay of the images. This overlaid image may be referred to as a 2p/confocal image, or a second overlaid image.

Figure 14:
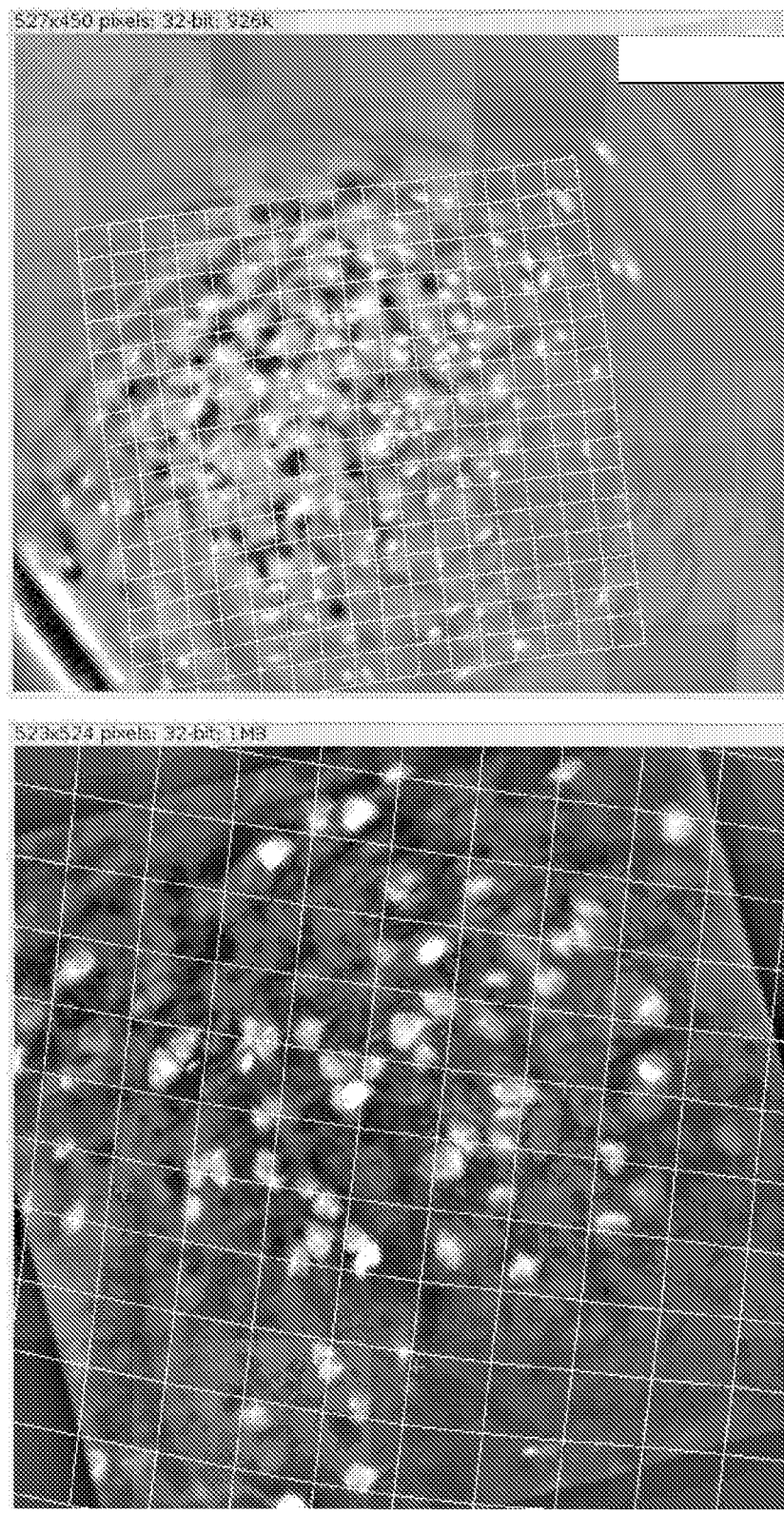
FIG. 14 shows an example of an elastic transformation.

The first overlaid image and the 2p/confocal image may be co-registered (step 1103 of FIG. 11). The co-registration may ensure that any distortions are removed, or translations are provided to allow for overlay of the images. For instance, the 2p/confocal image and the first overlaid image may be opened and go through unwarping software. For instance, the images may be opened in a program such as ImageJ (Fiji distribution which may include bUnwarpJ plug-in). A new bUnwarpJ window may pop up. The 2p/confocal image may be selected as a source image and the first overlaid image may be selected as a target image. A tool, such as a 'pen icon' from the menu may be used to set one or more landmarks. It may be desirable to select 3-4 clear landmarks. For instance, for each landmark, a marker may be provided on the first overlaid image. Then the user may switch to move the marker and move the corresponding landmarks on the 2p/confocal image. An input/output menu may be selected. The landmarks (landmark features) may be saved in a memory. A landmark weight may be set. For example, a landmark weight may be set to 10. The image weight may be gradually increased (e.g., start from 0.01). An option may be provided to save transformations. For instance, FIG. 14 shows an example of elastic transformation.

In some embodiments, images captured using one or more of constituent microscopes (of the imaging system employing the adapter as discussed above) may be co-registered by dividing/splitting the images into a plurality of sections or quadrants and performing image registrations for each section or quadrant independently. The divided sections may or may not be uniform in size and/or shape. A section may have any size or shape. In some cases, one or more non-linear aberrations may be introduced into the images by the different lenses and/or optical paths of the miniscopes and multi-photon (for example, two photon (2P)) microscopes used to capture the images. This may result in highly local differences across the images. Dividing the images into smaller images that are independently warped and registered can result in a better approximation of different optical aberrations within the images captured using the miniscopes and 2P microscopes of the present disclosure.

Figure 15A:
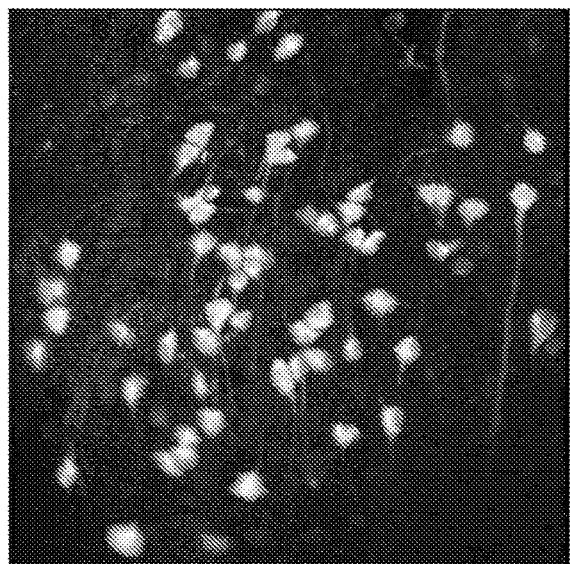
FIG. 15A shows an example of a to-be-transformed image.
Figure 15B:
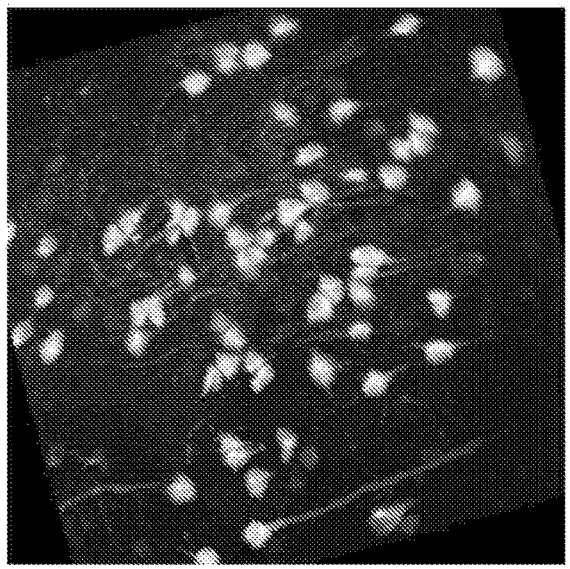
FIG. 15B shows an example of the transformed image.

As was alluded to above, in at least one specific implementation, the co-registration of the first overlaid image (such as a one-photon microscope image) and the second overlaid image (such as a 2p/confocal image) may be used to form a third overlaid image (by, for example, overlaying the first and second overlaid images with one another; at step 1104 of FIG. 11). Before the co-registration, the saved transformation may be saved to the source image first. As previously described, the 2p/confocal image may be selected as the source image. In Fiji ImageJ, the target image and the source image may be opened. FIG. 15A shows a to-be-transformed image. The bUnwarpJ plug-in may be opened, the saved landmarks file may be loaded, and the corresponding elastic transformation file may be loaded. The transformed image may be saved. FIG. 15B shows an example of the transformed image.

Figure 15C:
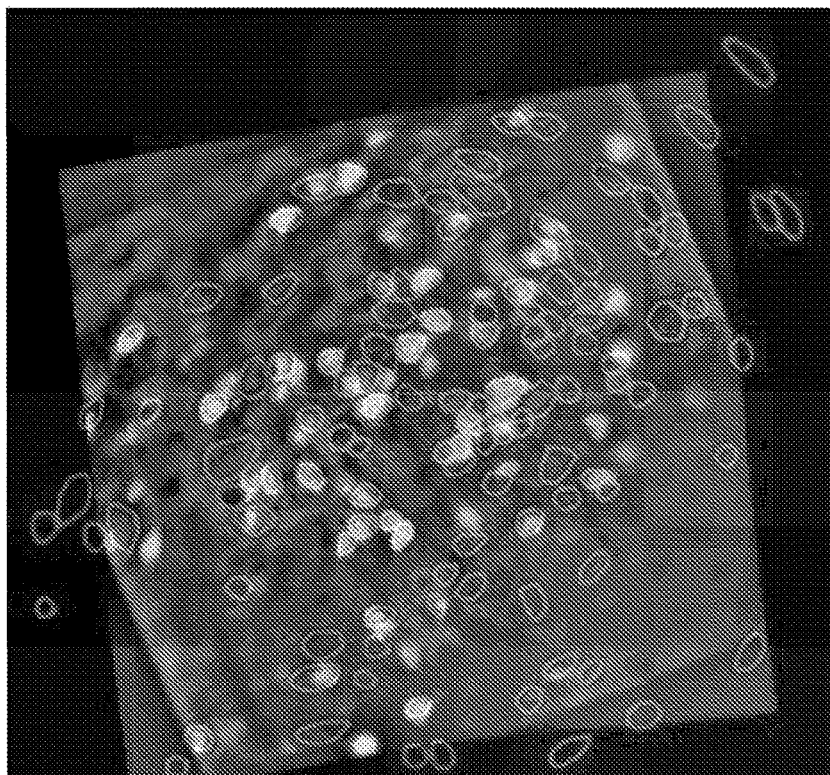
FIG. 15C shows an example of an overlay of a two-photon/confocal image (acquired along a green channel of the apparatus) with a one-photon miniscope functional cell contours (acquired along a red channel of the apparatus).

To generate the third overlaid image (by, for example, overlaying the now co-registered first overlaid image and the 2p/confocal overlaid image), the first overlaid image cell map may be configured in one spectral region (or example, via the red channel of the imaging system) and the second overlaid image (2p/confocal image) cell map may be configured in another spectral region (for example, formed through the green channel of the imaging system). FIG. 15C shows an example of the third overlaid image, while the red only show the map of the cell contour for easier visualization.

In any of the embodiments described herein, one or more transformations may be applied to align two or more images captured using any one or more microscopes of the present disclosure. The two or more images may comprise a functional cell map or image. The two or more images may comprise a structural cell map or image. In some embodiments, the two or more images may comprise the first overlaid image and/or the second overlaid image. The first overlaid image may correspond to an overlay of a functional cell image and a structural cell image. The second overlaid image may correspond to an overlay of a functional cell image and a structural cell image. The second overlaid image may comprise a two photon (2p)/confocal image as described above.

One or more landmark features that appear in the two or more images may be used to determine or generate a set of coordinate transformations for aligning the two or more images. In some embodiments, a ground-truth dataset may be generated and used to characterize a transformation between (i) images obtained using a miniature microscope and (ii) images obtained using another microscope (e.g., a two photon (2P) microscope). The ground-truth dataset may be generated using the one or more landmarks. The one or more landmarks may comprise a cell or a neuron that appears in the two or more images. In some embodiments, the ground-truth dataset may be used to characterize a transformation between two or more images obtained using one or more optical imaging modalities. The transformation may be characterized with respect to an image generated using a single imaging modality or with respect to a plurality of images generated using a plurality of different modalities. For example, the respective transformations for the respective images obtained using a set of optical image modalities may each be characterized with reference to the same reference data.

In some embodiments, generating a ground-truth dataset may comprise determining that 'cell X' in a first image (e.g. an image taken with a miniscope) is the same as 'cell Y' in a second image (e.g. an image taken with a two photon (2P) microscope) and correlating such data. In some embodiments, generating the ground-truth dataset may comprise observing a unique, measurable quality of a set of neurons in the first image and/or the second image, independent of the neuron's location and shape. For example, the unique, measurable quality may be measured for each neuron in the first image and/or the second image, independent of the neuron's location and shape. This may be achieved by imaging in visual cortex where individual neurons have specific tuning properties based on an orientation of light stimuli. Any of the imaging modalities described herein (e.g., miniscope and 2P) may be used to capture a neuron's response to light stimuli and define its tuning curve. Identical neurons in two or more images captured using different optical modalities may be identified by finding matching cells (in a same or similar local area) with a same or similar tuning curve generated in response to light stimuli. A ground-truth dataset may be generated by measuring a single unique, measurable quality or a plurality of unique, measurable qualities (e.g., responses to different types of light stimuli or other stimuli, etc.). For example, where a plurality of unique, measurable qualities are measured, a ground-truth dataset may be generated for each unique, measurable quality, and then each or a subset of the ground-truth datasets may be processed to generate one or more consensus ground-truth datasets. For example, such consensus ground-truth datasets may rule out outlying datasets (e.g., when it turns out the 'unique, measurable quality' used to generate that dataset was in fact not unique and introduced error). In some embodiments, the ground-truth dataset may be provided to and/or used with supervised machine learning algorithms (e.g., convolutional neural networks) to characterize and/or apply one or more coordinate transformations in order to align the two or more images captured using different microscopes or different optical modalities.

In some embodiments, the ground-truth dataset may be used to characterize a distribution of distances corresponding to an amount or a degree by which cells are 'warped' between different optical imaging methods. That is, after the two or more images have been aligned and registered, the ground-truth dataset may be used to determine how far apart the centers of the cell contours are across the two or more images captured using different optical imaging modalities. The distribution of distances may be used to refine or enhance the search for candidate matches. In some embodiments, the ground-truth dataset may be used to train convolutional neural networks to determine how the size, shape, position, and/or orientation of neurons in the images are altered between the two optical imaging modalities, given the location of the neurons in the field of view. Knowing how the sizes, shapes, positions, and/or orientations of the neurons are altered between different optical imaging modalities may help to determine, for example, how a circular cell contour in a two photon (2P) image could be distorted or modified (e.g., by becoming elongated at the edges of a miniscope image). This approach may be combined or used with any of the embodiments described herein to more accurately search for and identify the same cells in aligned, registered images that are taken with the miniscope and 2P microscopes and that have the same or similar field of view.

Images from the first microscope and the second microscope may be processed substantially simultaneously or in sequence. The images may be processed as they are received. The images may be stored and/or processed at a later time. The image processing may be initiated by a user, or may automatically be initiated in real-time or upon detection of an event.

The images from the microscopes may be captured at substantially the same time, or at different times. An adapter may support both microscopes while the images are being captured. Alternatively, the microscopes may capture images without aid of an adapter. The adapter may advantageously ensure that the microscopes are capturing images of the same region. Both microscopes may share an optical probe which may ensure that the images captured by the microscopes are of the same location. For instance, a location may be a portion of a brain of a subject. When both microscopes are capturing images simultaneously, they may be capturing images at the same time of the same location. When the microscopes are collecting data without aid of an adapter, they may optionally not be capturing images of the exact same location. They may capture images of approximately the same location and image recognition and/or alignment techniques may be utilized to aid in creating the image overlays. For instance, a user may manually view the images and indicate a region of the images that overlap, and then further fine-alignment may be performed with aid of one or more algorithm. Alternatively, an algorithm may be used to recognize which portions of the images overlap, and then further fine tuning of the images to create the overlays may occur. In some instances, vasculature, or one or more landmarks in the images may be identified or selected, to aid in the high-level location of the areas of the images to be co-registered. Then further fine-turning may occur as described herein, and used to create the overlaid images.

Even when an adapter of the imaging system of the invention is not utilized, both image modalities may be employed for the same subject, such as the same living animal. When the images are taken at different points in time with different microscopes, the animal may be freely moving for the different microscopes, may be partially or completely immobilized (e.g., head-fixed) for the different microscopes, or may be freely moving for one microscope while partially or completely immobilized for the other microscope. In some instances, the subject may be living for each of the images captured using the different modalities. Alternatively, the subject may be sacrificed and not living for each of the images captured using the different modalities. Alternatively, the subject may be living when images captured using the first image modality, and may have been sacrificed when images are captured using the second image modality. In some instances, it may be advantageous to capture images using a first modality while the subject is alive. Then the subject may be sacrificed. The brain or other imaging areas of the subject may be fixed and cleared by treating the brain in chemicals. Then the image of the whole brain or the corresponding area (that matches the imaging area of the first imaging modality) may be captured using the second modality. In some instances, both the first and second imaging modalities may be used after sacrifice, but prior to and subsequent to clearing the brain, respectively. Any description herein of multi-modal imaging and alignment and overlays, may apply to any type of imaging, with any type of circumstances, such as those described herein.

Any of the images described herein may be displayed on a user interface. The images may optionally be displayed in color on the user interface. The user interface may be local or remote to the microscopes and/or adapter. The user interface may on an electronic device or computer system as described elsewhere herein.

Any of the steps and/or processes provided herein may take place on-board or off-board any of the devices described herein. For instances, one or more of the steps described herein may take place on-board the first microscope, the second microscope, the adapter, a communication hub, or any device in communication with any of the above. In some instances, one or more of the steps may take place on-board a computer, server, or cloud-computing infrastructure.

Figure 16:
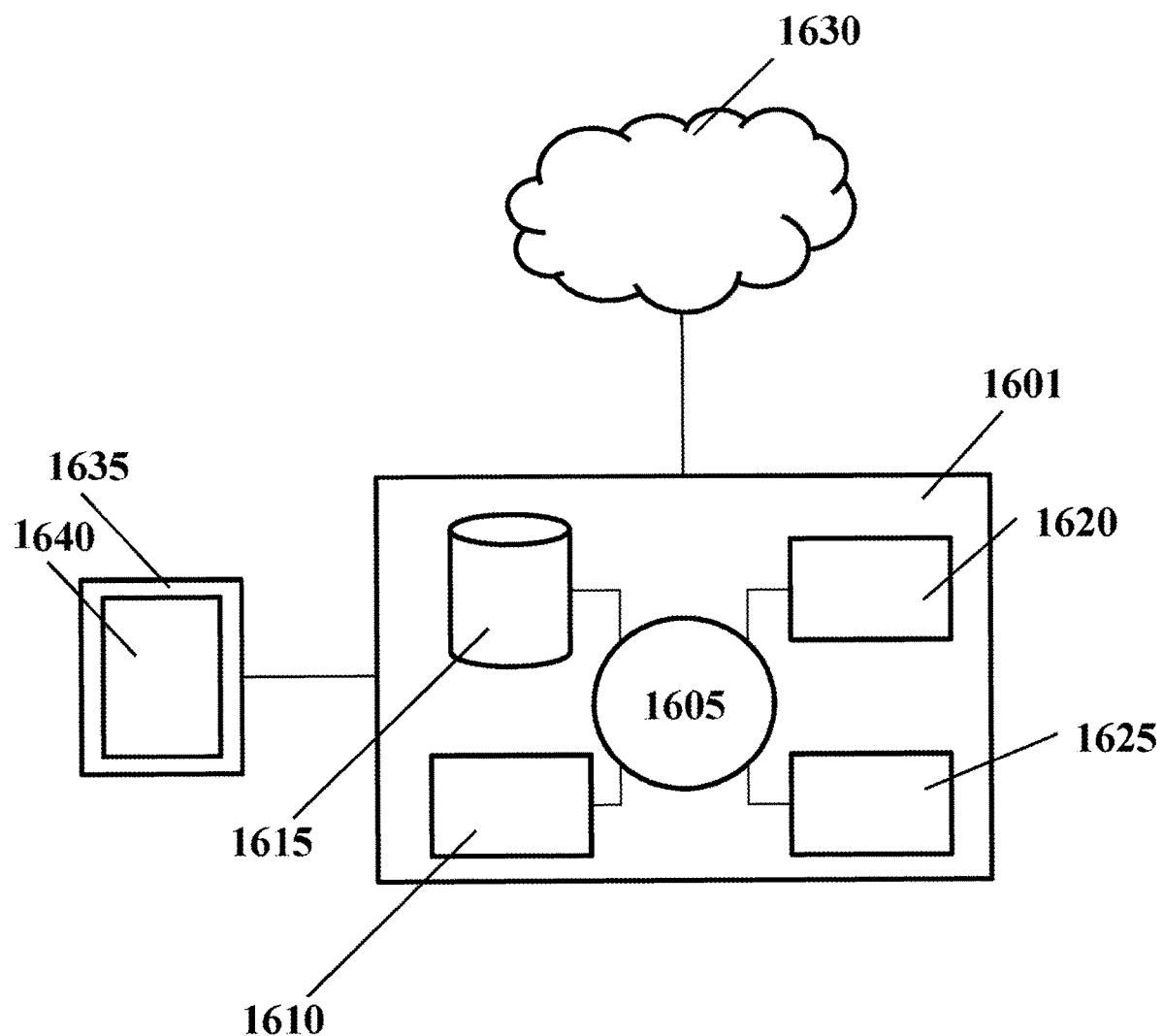
FIG. 16 shows an example of a computer system for use with an embodiment of the invention.

The present disclosure provides computer systems that are programmed to implement methods and systems of the disclosure. FIG. 16 shows a computer system 1601 that is programmed or otherwise configured to implement a model management system as described above. The computer system 1601 can regulate various aspects of the present disclosure, such as, for example, implementing various steps relating to image acquisition, processing, overlay, rendering, and the other functions as described elsewhere herein. The computer system 1601 can be an electronic device of a user or a computer system that is remotely located with respect to the electronic device. The electronic device can be a mobile electronic device. The electronic device can be a microscope, adapter, communication hub, or any other device.

The computer system 1601 includes a central processing unit (CPU, also "processor" and "computer processor" herein) 1605, which can be a single core or multi core processor, or a plurality of processors for parallel processing. The computer system 1601 also includes memory or memory location 1610 (e.g., random-access memory, read-only memory, flash memory), electronic storage unit 1615 (e.g., hard disk), communication interface 1620 (e.g., network adapter) for communicating with one or more other systems, and peripheral devices 1625, such as cache, other memory, data storage and/or electronic display adapters. The memory 1610, storage unit 1615, interface 1620 and peripheral devices 1625 are in communication with the CPU 1605 through a communication bus (solid lines), such as a motherboard. The storage unit 1615 can be a data storage unit (or data repository) for storing data. The computer system 1601 can be operatively coupled to a computer network ("network") 1630 with the aid of the communication interface 1620. The network 1630 can be the Internet, an internet and/or extranet, or an intranet and/or extranet that is in communication with the Internet.

The network 1630 in some cases is a telecommunication and/or data network. The network 1630 can include one or more computer servers, which can enable distributed computing, such as cloud computing. For example, one or more computer servers may enable cloud computing over the network 1630 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1630, in some cases with the aid of the computer system 1601, can implement a peer-to-peer network, which may enable devices coupled to the computer system 1601 to behave as a client or a server.

The CPU 1605 can execute a sequence of machine-readable instructions, which can be embodied in a program or software. The instructions may be stored in a memory location, such as the memory 1610. The instructions can be directed to the CPU 1605, which can subsequently program or otherwise configure the CPU 1605 to implement methods of the present disclosure. Examples of operations performed by the CPU 1605 can include fetch, decode, execute, and writeback.

The CPU 1605 can be part of a circuit, such as an integrated circuit. One or more other components of the system 1601 can be included in the circuit. In some cases, the circuit is an application specific integrated circuit (ASIC).

The storage unit 1615 can store files, such as drivers, libraries and saved programs. The storage unit 1615 can store user data, e.g., user preferences and user programs. The computer system 1601 in some cases can include one or more additional data storage units that are external to the computer system 1601, such as located on a remote server that is in communication with the computer system 1601 through an intranet or the Internet.

The computer system 1601 can communicate with one or more remote computer systems through the network 1630. For instance, the computer system 1601 can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1601 via the network 1630.

Methods as described herein can be implemented by way of machine (e.g., computer processor) executable code stored on an electronic storage location of the computer system 1601, such as, for example, on the memory 1610 or electronic storage unit 1615. The machine executable or machine readable code can be provided in the form of software. During use, the code can be executed by the processor 1605. In some cases, the code can be retrieved from the storage unit 1615 and stored on the memory 1610 for ready access by the processor 1605. In some situations, the electronic storage unit 1615 can be precluded, and machine-executable instructions are stored on memory 1610.

The computer system 1601 can include or be in communication with an electronic display 1635 that comprises a user interface (UI) 1640 for providing, for example, the various components (e.g., lab, launch pad, control center, knowledge center, etc.) of the model management system. Examples of UI's include, without limitation, a graphical user interface (GUI) and web-based user interface.

One or more microscopes may be provided. The microscopes may be used to collect image data. The microscopes may comprise one or more chips or processors that may aid in capturing image data. The microscopes may be capable of communicating directly with the computer system 1601, or indirectly with the computer system. The computer system may be integrated into one or more microscopes. The microscopes may communicate with a computer system over a network, or directly via one or more hard-wired communication interfaces. The microscopes may communicate with a communication hub that may be directly or indirectly in communication with the computer system. The microscopes may or may not communicate with an adapter that may communicate with the communication hub, or may directly or indirectly be in communication with the computer system. The computer system may be integrated into one or more adapters.

Methods and systems of the present disclosure can be implemented by way of one or more algorithms. An algorithm can be implemented by way of software upon execution by the central processing unit 1605. The algorithm can, for example, aid in the capture of images, allow for preprocessing and/or processing of the one or more images, allow for overlay of the images, allow for co-registration of the images, and/or allow for the display and/or manipulation of the images.

Example 1—Image Acquisition Workflow

This example illustrates one non-limiting approach to the use of the disclosed adapter for collecting one-photon and two-photon images:

1. Place a flat field test target under the adapter. For example, fluorescent beads (~7 μm in diameter) dried onto a microscope slide or onto the end of a straight GRIN probe may be used as a flat field test target.
2. Focus the two-photon microscope while the dichroic mirror on the adapter is positioned out of the light path.
3. Insert the dichroic mirror into the light path.
4. Focus on the test target using the one-photon microscope using the focusing the wheel. The two microscopes are now focused on the same plane. If imaging though a GRIN lens inserted into the tissue, we recommend placing a GRIN lens with the same optical specifications on the test target and aligning the focal planes while imaging though the GRIN lens. This will more accurately compensate for optical aberrations in the GRIN lens.
5. Remove the test target and place the animal (or other samples) under the adapter.
6. Switch to the one-photon microscope and focus on the cell plane of interest.
7. Record one-photon video data (or capture still images) as needed, depending on the experimental goals.
8. Switch to the two-photon microscope and collect a z stack of images (i.e., a series of images wherein the focal plane of each subsequent image is displaced along the z- or optical axis) that contains the same target volume imaged with the one-photon microscope. We recommend collecting images over a z-axis range encompassing at least 50 μm above and below the focal plane of the 1P microscope. This will ensure that the one-photon data captured or recorded falls within the sample volume encompassed by the collected z-stack images. In some instances, one may also collect dynamic volumetric recordings (e.g., recordings of cell firing from multiple cell planes that can then be registered with cells that fired during one-photon imaging. This may make the image contrast obtained for the one-photon and two-photon images more similar, and may enhance the image registration process).

9. Depending on the goals of the experiment, one can image using different indicators that fluoresce at different wavelengths (colors), and which may indicate either static or dynamic processes, or some combination thereof.

Example 2—Image Registration Workflow

One application of the disclosed adapter is for image registration and alignment of the images and/or video data captured or recorded simultaneously (or quasi-simultaneously) from the same sample or subject, e.g., a laboratory animal, using both two-photon and one-photon microscopes. This example illustrates one non-limiting approach used to register the two images:

1. Project the one-photon recording collected over time (i.e., a series of images or video data) into a single image (e.g., by projecting the maximum intensity image data on a pixel-by-pixel basis). We recommend projecting the maximum intensities to ensure that all of the cells that have fired during the recording have been included. The goal is to obtain a single image that shows all of the cells that have fired. Any image correction that may be required, e.g., motion correction, should be performed as necessary prior to the projection step.

2. Bandpass filter the projected image. This will remove the low frequency background and high frequency noise, and enhance the contrast for image registration. We currently use two methods for filtering:

2a. Gaussian blur. A Gaussian blur of the image (also known as Gaussian smoothing) is subtracted from the original image to remove background, and a second Gaussian blur step is performed to remove high frequency content.

2b. Gaussian filtering in Fourier space. This approach filters out large "structures" in the image (e.g., performs flat field or shading correction) and small "structures" (e.g., smooths the image) by removing large and small structures of the specified size using Gaussian filtering in Fourier space.

3. Identify the subset of two-photon z-stack images that correspond to the focal depth of the one-photon microscope. The focal depth of the one-photon microscope is much thicker than that for the individual two-photon optical image slices (e.g., the nVista miniature microscope currently has a depth of field of 20 µm, which is an order of magnitude thicker than a typical two-photon image slice). Therefore, the cells visible in the one-photon microscope image recordings may come from multiple planes. A non-limiting example of a method/algorithm for identifying two-photon optical sections that correspond to the one-photon focal depth is as follows:

3a. Assume an initial guess for the number of two-photon optical slices corresponding to the focal depth of the one-photon microscope. For example, if the one-photon microscope has focal depth of 20 µm, and you have collected z-stacked two-photon images with a z-axis displacement of 3 µm per step (i.e., the optical slices are approximately 3 µm in thickness), the focal depth of the one-photon microscope corresponds to roughly 7 two-photon optical slices.

3b. Generate a moving projection of two-photon optical slices. For example, project optical slices 1 to 7 into one image, slices 2 to 8 into a next image, slices 3 to 9 into a third image, and so on.

3c. Bandpass filter the projections using the same filter as used in step 2.

3d. Calculate the cross-correlation of the one-photon filtered image from step 2 with every image obtained in step 3c to identify the corresponding two-photon image.

4. Align/register the one-photon image and two-photon images identified in step 3d, we use an elastic registration algorithm. The main reason behind using an elastic registration algorithm is that spherical aberrations in the one-photon microscope are spatially different than those in the two-photon microscope. Therefore, the two images need to be aligned using translation, rotation, shear, and elastic deformations. The alignment/registration algorithm that is currently being used is based on vector-spline regularization, as explained in detail in Sorzano, et al. (2005), IEEE Transactions on Biomedical Engineering 52:652-663. Other alignment/registration algorithms have not been tested, but may also be used for this application (see, for example, Maes, et al., IEEE Transactions on Medical Imaging, Vol. 16(2), April 1997). The registration algorithm used primarily relies on minimizing contrast error between the two images. In addition, one can choose a set of one or more landmarks that appear in both images to help facilitate convergence of the algorithm to a single set of coordinate transformations. To obtain higher contrast for cells in the two images, e.g., when registration of dynamic GCaMP activity is desired, we recommend using volumetric imaging of the GCaMP activity. In this approach a time series recording is acquired in each optical slice (volumetric dynamic imaging), therefore, one needs to project recordings both in time and space (z direction). Cell firing will be recorded from multiple cell planes, and then registered with cells that fired during one-photon imaging. This will ensure that the image contrast for the two-photon and one-photon images is comparable, and will facilitate image registration.

5. Record the transformation (mapping) function calculated in step 4 and apply to the non-reference image to align the one-photon and two-photon images. Either image may be used as the reference image however, using the two-photon image as reference may facilitate image registration and further alignment.

6. Apply the mapping function to other corresponding images, e.g., if other channels/fluorophores have been recorded.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The term "A and/or B" or a similar term means "A alone, B alone, or A and B together" and is defined to be interchangeable with the term "at least one of A and B." The term "image" refers to and is defined as an ordered representation of detector signals corresponding to spatial positions. For example, an image may be an array of values within an electronic memory, or, alternatively, a visual or visually-perceivable image may be formed on a display device such as a video screen or printer.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. An optical imaging apparatus configured to carry out multi-modal imaging of an internal tissue within a subject, the apparatus comprising:
    an adapter comprising 1) a first microscope interface configured to optically couple a first microscope system to an optical element inside the adapter to provide first imaging data of a sample, and 2) a second microscope interface configured to optically couple a second microscope system to the optical element to provide second imaging data of the sample;
    an optical assembly that is coupled with the adapter at an interface of the first and second microscope interfaces and that includes:
        i. a portion of an illumination optical arm of a chosen microscope system of the first and second microscope systems, said portion of the illumination optical arm comprising one or more illumination light-emitting elements and configured to direct illumination light to said tissue within a specified field-of-view (FOV); and
        ii. a portion of a stimulation optical arm of the chosen microscope system comprising one or more stimulation light-emitting elements and configured to direct stimulation light to at least one of a first portion of said tissue within the specified FOV, a second portion of said tissue outside of the specified FOV, and to a third portion of said tissue that is partially within the specified FOV;
    and
    a processor operably cooperated with the optical assembly and a tangible readable memory medium that comprises software-encoded instructions which, when loaded onto the processor, cause said processor:
    (A) (i) to govern an operation of said one or more illumination light-emitting elements to modulate the illumination light in a time-dependent and/or spatially-dependent fashion; and/or
        (ii) to govern an operation of said one or more stimulation light-emitting elements to modulate the stimulation light in a time-dependent and/or spatially-dependent manner; and/or
        (iii) to adjust an effective focal length of the chosen microscope system;
    and/or
    (B) (i) to process functional imaging data, received through the adapter, to generate a first overlaid image,
        (ii) to process structural imaging data, received through the adapter, to generate a second overlaid image, and
        (iii) to co-register the first overlaid image and the second overlaid image with the use of aligning at least a portion of the first overlaid image and the second overlaid image based at least in part on a coordinate transformation, wherein the coordinate transformation is derived based at least in part on a difference in sizes, shapes, positions, or orientations of a landmark feature present both in the first overlaid image and the second overlaid image.

2. An apparatus according to claim 1, further comprising an optical probe that is optically and/or mechanically coupled with the optical element and the optical assembly through an interface of the first and second interfaces and that is configured to deliver the illumination light and the stimulation light to said internal tissue without transmitting said illumination light and/or said stimulation light through a biological barrier surrounding said subject.

3. An apparatus according to claim 2, wherein, when delivering the illumination light and the stimulation light to said internal tissue without transmitting said illumination light and/or said stimulation light through the biological barrier, the optical probe is configured to be in direct contact with the subject.

4. An apparatus according to claim 2, wherein the optical probe is configured to collect light reflected, scattered, or emitted by said tissue and relay said light to an imaging optical arm of the apparatus and/or wherein the optical probe is configured as a lens or lens system at least partially implantable in said subject and/or wherein said optical probe is configured as an optical component shared by said illumination optical arm and said stimulation optical arm.

5. An apparatus according to claim 2, wherein said optical probe possesses non-zero optical power.

6. An apparatus according to claim 1, further comprising one or more deformable lenses configured to adjust a corresponding focal depth of at least one of the illumination optical arm and the stimulation optical arm.

7. An apparatus according to claim 1, wherein the optical assembly further includes a portion of an imaging optical arm of the chosen microscope system, said portion of the imaging optical arm comprising an image sensor and configured to receive an imaging light including light reflected, scattered, or emitted by said tissue to generate an image of the tissue within the specified FOV.

8. An apparatus according to claim 7, further comprising an optical probe (a) that is optically and/or mechanically coupled with the optical assembly through an interface of the first and second interfaces and that is configured to deliver the illumination light and the stimulation light to said internal tissue without transmitting said illumination light and/or said stimulation light through a biological barrier surrounding said subject and (b) that is configured as an optical component shared by said illumination optical arm, said stimulation optical arm, said imaging optical arm, and any combination thereof.

9. An apparatus according to claim 7, wherein the illumination optical arm, the stimulation optical arm, and the imaging optical arm share at least one deformable lens.

10. An apparatus according to claim 1, configured to image said internal tissue onto the image sensor with a spatial resolution of better than 2 um at a center of a corresponding FOV.

11. An apparatus according to claim 1, wherein the processor is configured to generate the second overlaid image by using the structural data to generate a multi-photon structural image and/or confocal structural image, using the functional data to generate a multi-photon functional image and/or confocal/confocal functional image, and overlaying the multi-photon structural image and/or confocal structural image with the multi-photon functional image and/or confocal functional image.

12. An apparatus according to claim 1, wherein the processor is configured to use the difference in sizes, shapes, positions, or orientations of the landmark feature in the first overlaid image and in the second overlaid image to determine an amount of distortion or warping of the landmark feature between the first overlaid image and the second overlaid image.

13. An apparatus according to claim 1, wherein the processor is further configured to generate a third overlaid image from the first overlaid image and the second overlaid image after said co-registering.

14. An apparatus according to claim 13, wherein the processor is configured to set the first overlaid image to a first color channel and the second overlaid image to a second color channel different from the first color channel when generating the third overlaid image.

15. An apparatus according to claim 1, wherein the processor is configured to generate the first overlaid image by obtaining a first cell map, constructing a structural image from a projection of a motion corrected movie, and overlaying the cell map with the structural image.

16. An apparatus according to claim 15, wherein the constructing a structural image includes constructing the structural image from at least one of a maximum projection of the motion corrected movie and a variance projection of the motion corrected movie.

17. An apparatus according to claim 1, wherein the first microscope system includes a one-photon microscope or a multi-photon microscope and/or wherein the second microscope system includes a confocal microscope.

18. An apparatus according to claim 1, wherein the first microscope system and the second microscope system include microscopes of different types.

19. An apparatus according to claim 18, wherein the chosen microscope system weighs 20 grams or less and/or a volume of 30 $cm^3$ or less.

20. An apparatus according to claim 1, wherein the first microscope interface is configured to permit the adapter to bear weight of the first microscope system and/or wherein the second microscope interface is configured to permit the adapter to bear weight of the second microscope system.

21. An apparatus according to claim 1, wherein, when the processor is configured to generate the first and second overlaid images, the processor is further configured to use a difference in sizes, shapes, positions, or orientations of a landmark feature present both in the first overlaid image and in the second overlaid image to train a neural network to determine how a size, a shape, a position, or an orientation of the landmark feature is altered between different optical imaging modalities present in the system.

22. A method for forming an image of an internal tissue of a subject, the method comprising:
(a) removably attaching a housing, which contains an optical assembly of an optical imaging apparatus to the adapter, wherein adapter has been connected to the subject in a fixed position, to align the optical imaging apparatus with respect to the internal tissue, wherein the optical imaging apparatus includes:
an adapter comprising 1) a first microscope interface configured to optically couple a first microscope system to an optical element inside the adapter to provide first imaging data of a sample, and 2) a second microscope interface configured to optically couple a second microscope system to the optical element to provide second imaging data of the sample,
the optical assembly that is coupled with the adapter at an interface of the first and second microscope interfaces and that includes:
1. A portion of an illumination optical arm of a chosen microscope system of the first and second microscope systems, said portion of the illumination optical arm comprising one or more illumination light-emitting elements and configured to direct illumination light to said tissue within a specified field-of-view (FOV); and
2. A portion of a stimulation optical arm of the chosen microscope system comprising one or more stimulation light-emitting elements and configured to direct stimulation light to at least one of a first portion of said tissue within the specified FOV, a second portion of said tissue outside of the specified FOV, and to a third portion of said tissue that is partially within the specified FOV;

(b) delivering at least one of (i) imaging light from the one or more illumination light-emitting elements through the portion of the illumination optical arm of said chosen microscope system, and (ii) stimulation light from the one or more stimulation light-emitting elements through the portion of the stimulation optical arm of said chosen microscope system to the internal tissue; and (c) acquiring, at an image sensor of said chosen microscope system, light that has been reflected, scattered, or emitted by said internal tissue to generate the image of said internal tissue.

23. A method according to claim 22, wherein said delivering and/or said acquiring includes transmitting light through an optical probe an optical that is optically and/or mechanically coupled with the optical element and the optical assembly through an interface of the first and second interfaces.

24. A method according to claim 22, wherein said delivering does not include transmitting the imaging light and/or the stimulation light through a biological barrier surrounding said tissue.

25. A method according to claim 22, wherein said delivering and/or said acquiring includes transmitting light through an optical probe of said microscope system, wherein the optical probe includes a GRIN lens.

26. A method according to claim 22, wherein:
(a) the optical imaging system further includes a portion of an imaging optical arm of the chosen microscope system, said portion of the imaging optical arm comprising an image sensor and configured to receive light reflected, scattered, or emitted by said tissue to generate an image of the tissue within the specified FOV; and
(b) wherein said delivering and/or said acquiring includes transmitting light through one or more deformable lenses configured to adjust a corresponding focal depth of at least one of the illumination optical arm, the stimulation optical arm, and the imaging optical arm.

27. A method according to claim 22, further comprising:
processing functional imaging data, received through the adapter, with a processor operably cooperated with the image sensor, to generate a first overlaid image,
processing structural imaging data, received through the adapter, to generate a second overlaid image, and
co-registering the first overlaid image and the second overlaid image with the use of aligning at least a portion of the first overlaid image and the second overlaid image based at least in part on a coordinate transformation.

28. A method according to claim 27, wherein the coordinate transformation is derived based at least in part on a difference in sizes, shapes, positions, or orientations of a landmark feature present both in the first overlaid image and the second overlaid image.

29. A method according to claim 22, further comprising:
modulating the illumination light in a time-dependent and/or spatially-dependent fashion; and/or
modulating the stimulation light in a time-dependent and/or spatially-dependent manner; and/or
adjusting an effective focal length of the chosen microscope system of the first and second microscope systems.

30. An optical imaging apparatus configured to carry out multi-modal imaging of an internal tissue within a subject, the apparatus comprising:
an adapter comprising 1) a first microscope interface configured to optically couple a first microscope system to an optical element inside the adapter to provide first imaging data of a sample, and 2) a second microscope interface configured to optically couple a second microscope system to the optical element to provide second imaging data of the sample;
an optical assembly that is coupled with the adapter at an interface of the first and second microscope interfaces and that includes:
(i) a portion of an illumination optical arm of a chosen microscope system of the first and second microscope systems, said portion of the illumination optical arm comprising one or more illumination light-emitting elements and configured to direct illumination light to said tissue within a specified field-of-view (FOV); and
(ii) a portion of a stimulation optical arm of the chosen microscope system comprising one or more stimulation light-emitting elements and configured to direct stimulation light to at least one of a first portion of said tissue within the specified FOV, a second portion of said tissue outside of the specified FOV, and to a third portion of said tissue that is partially within the specified FOV;
and
a processor operably cooperated with the optical assembly and a tangible readable memory medium that comprises software-encoded instructions which, when loaded onto the processor, cause said processor:
(A) (i) to govern an operation of said one or more illumination light-emitting elements to modulate the illumination light in a time-dependent and/or spatially-dependent fashion; and/or
(ii) to govern an operation of said one or more stimulation light-emitting elements to modulate the stimulation light in a time-dependent and/or spatially-dependent manner;
and/or
(iii) to adjust an effective focal length of the chosen microscope system;
and/or
(B) (i) to process functional imaging data, received through the adapter, to generate a first overlaid image,
(ii) to process structural imaging data, received through the adapter, to generate a second overlaid image, and
(iii) to co-register the first overlaid image and the second overlaid image by dividing the first overlaid image and the second overlaid image into a plurality of sections and performing image registration for each section of the plurality of sections.

31. An apparatus according to claim 30, wherein said software-encoded instructions are configured to cause the processor:
to deliver said stimulation light to said internal tissue in a pattern; and/or
to alter said pattern based on a response of said tissue to said stimulation light; and/or
to modify the pattern based detecting an object of interest at said internal tissue within the specified FOV based on analysis of an image of said internal tissue generated at the image sensor.

* * * * *